(12) United States Patent
Kamenov

(10) Patent No.: US 8,030,790 B2
(45) Date of Patent: Oct. 4, 2011

(54) HYBRID WATER PRESSURE ENERGY ACCUMULATING WIND TURBINE AND METHOD

(76) Inventor: Kamen George Kamenov, San Francisco, CA (US)

( * ) Notice: Subject to any disclaimer, the term of this patent is extended or adjusted under 35 U.S.C. 154(b) by 304 days.

(21) Appl. No.: 12/384,797

(22) Filed: Apr. 8, 2009

(65) Prior Publication Data

US 2011/0133466 A1  Jun. 9, 2011

(51) Int. Cl.
  *F03B 17/00* (2006.01)
(52) U.S. Cl. .................. 290/43; 290/44; 290/54; 290/55
(58) Field of Classification Search .................. 290/43, 290/44, 54, 55; 60/641.3, 641.2, 641.4, 325, 60/398, 698; 165/45, 48.2; 166/302; 62/260; 416/194, 196 A
See application file for complete search history.

(56) References Cited

U.S. PATENT DOCUMENTS

| | | | |
|---|---|---|---|
| 1,596,373 A * | 8/1926 | Preston | 416/194 |
| 3,995,972 A | 12/1976 | Nassar | |
| 4,010,614 A | 3/1977 | Arthur | |
| 4,031,702 A | 6/1977 | Burnett | |
| 4,166,222 A | 8/1979 | Hanley | |
| 4,206,608 A | 6/1980 | Bell | |
| 4,284,899 A | 8/1981 | Bendkins | |
| 4,426,846 A * | 1/1984 | Bailey | 60/398 |
| 4,443,707 A | 4/1984 | Scieri | |
| 5,829,956 A * | 11/1998 | Chen et al. | 416/196 A |
| 6,023,105 A * | 2/2000 | Youssef | 290/54 |
| 6,748,737 B2 | 6/2004 | Lafferty | |
| 6,861,766 B2 * | 3/2005 | Rembert | 290/43 |
| 7,471,010 B1 | 12/2008 | Fingersh | |
| 2007/0200350 A1 * | 8/2007 | Bacon | 290/44 |

* cited by examiner

*Primary Examiner* — Tho D Ta

(57) ABSTRACT

A hybrid water pressure energy accumulating, wind turbine tower assembly used to directly propel water pumps to raise water from low elevation reservoir(s) to high elevation reservoir(s) where it is used as a potential energy. The wind tower assembly includes a wind turbine having propeller with a rotor, a generator driven by the rotor and a yaw assembly attached to a tower with a foundation. The tower includes in-tower storage reservoirs configured for storing water. The in-tower storage reservoirs could be defined by lower and upper water storage containers attached to the inner or outer surface of the tower that might be connected to other neighboring reservoir(s). The wind turbine may be of the vertical or horizontal-axis type and may be installed inside a residential or commercial building. The lifted water is used to generate electricity utilizing a hydropower generator.

13 Claims, 20 Drawing Sheets

FIG. 9A
FIG. 9B
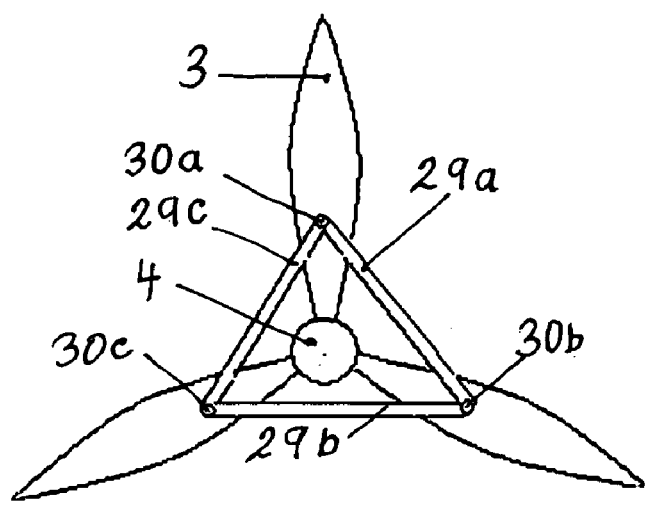
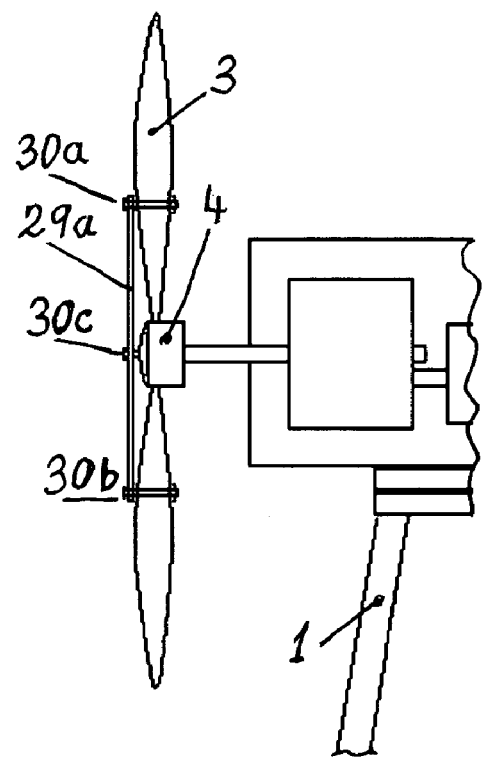

FIG. 9A
FIG. 9C
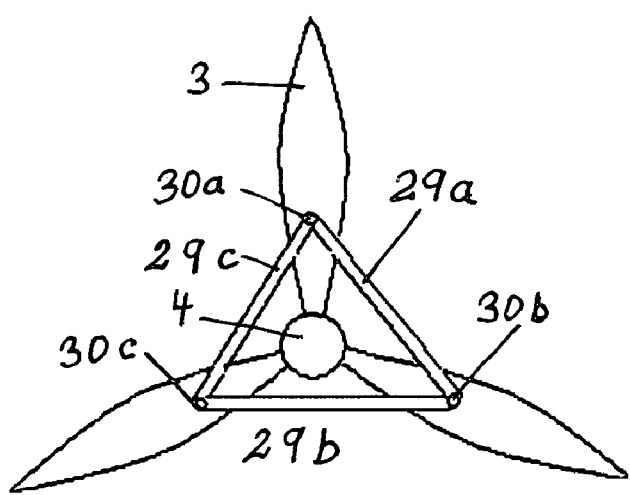
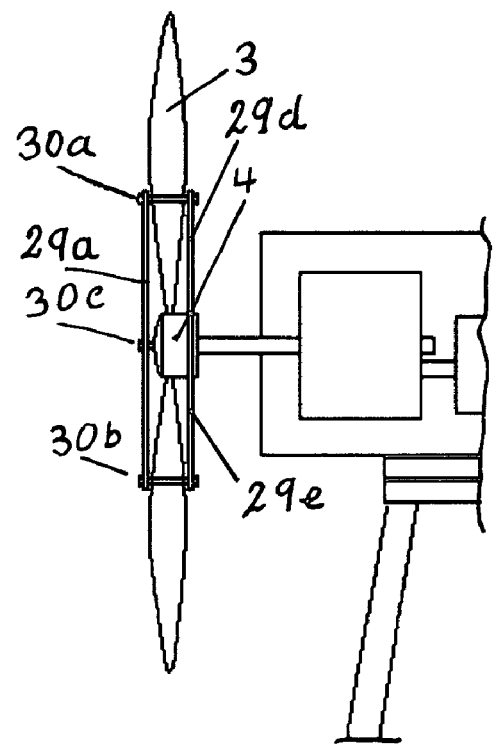

FIG. 9A
FIG. 9E
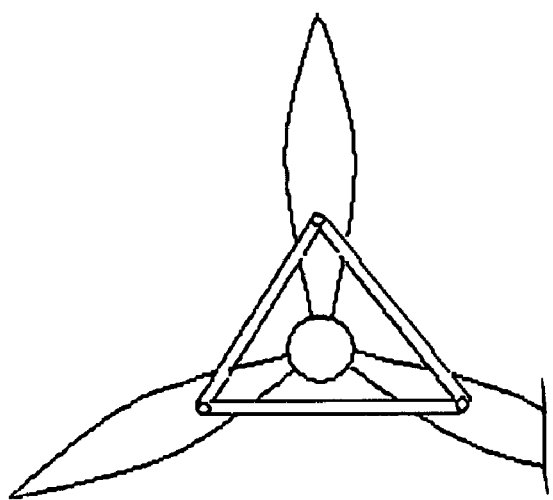
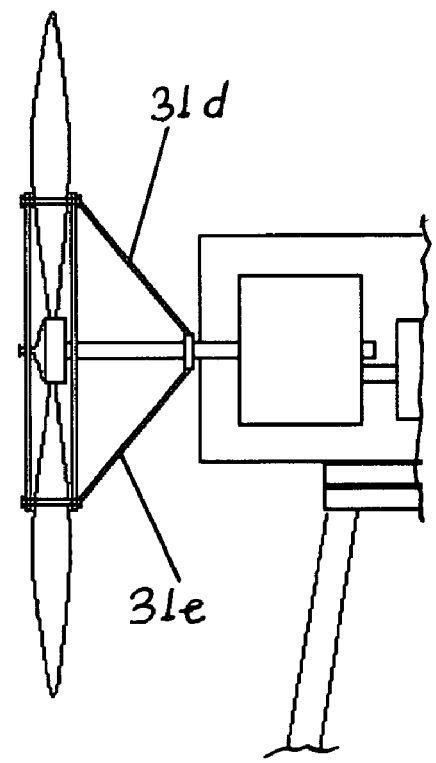

FIG. 9A
FIG. 9F
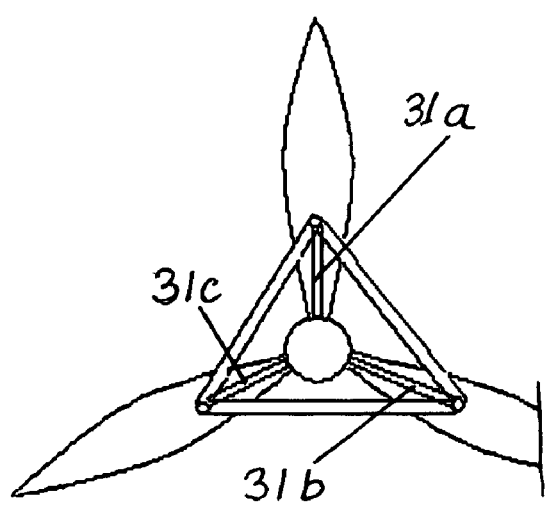
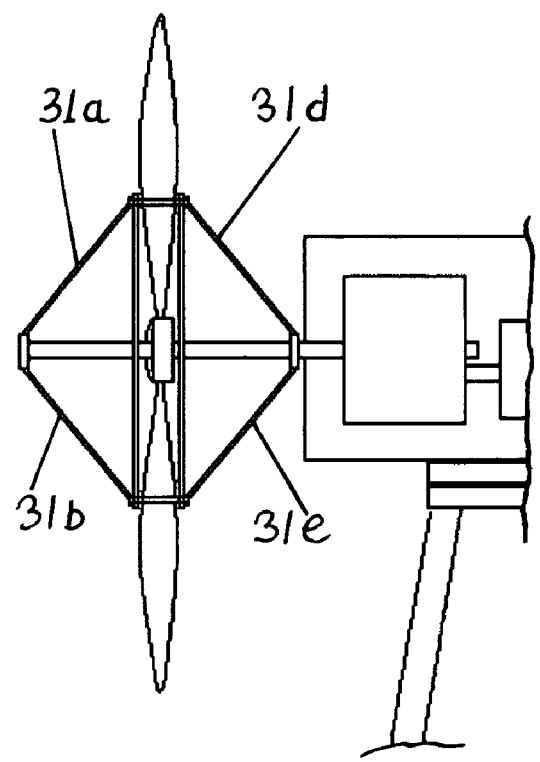

HYBRID WATER PRESSURE ENERGY ACCUMULATING WIND TURBINE AND METHOD

TECHNICAL FIELD

This invention relates generally to the field of alternative energy generating wind turbines used for generating electricity, and more specifically to hybrid water pressure energy accumulating wind turbine towers modified for storing water as potential energy for immediate or later use as electric energy and for transmission over the grid. The above disclosure sets forth a number of embodiments of the present invention. Other arrangements or embodiments, not precisely set forth, could be practiced under the teaching of the present invention and as set forth in the following claims.

BACKGROUND OF THE INVENTION

Natural energy is available throughout the world in various forms such as wind, solar, tidal and wave energy. Wind turbines have been used for production of electricity although such use has typically been limited to the production of small amounts of direct current (DC) electricity.

Conventional sources of energy for the production of electricity are in an ever-dwindling supply, which necessitates that natural forms of energy be utilized to a greater extent. The natural forms of energy are effectively inexhaustible and are typically available in different forms throughout the world.

The first machine to generate electricity from wind was designed and built in Denmark in 1890. Subsequently, several hundred machines were built in that country.

In the United States, wind machines were widely used to generate electricity in rural areas until the 1930's, providing farmers with electricity, when the US Congress enacted the Rural Electrification Act, which effectively electrified the country.

In 1931, in the (then) Soviet Union, the first relatively large wind turbine of 100-kilowatt capacity was built.

In 1941, in the United States, a 1,250-kilowatt wind machine was designed and built. Shortly after beginning the operation, a main bearing and a blade failed. Because of World War II, the machine was never repaired and it was subsequently dismantled.

Today wind turbines for producing electricity are widely used in some countries. In 2007 Germany was a leading power in wind energy production followed by USA:

1. Germany—22.248 MW, 2. USA—16.818 MW, 3. Spain—15.145 MW, 4. India—8.000 MW, 5. China—6.050 MW.

In 2008 the leading German firm Enercon began installation of the world's largest wind turbine Enercon E-126 with a power of 6-megawatt (MW) which is enough to supply electricity to 4,500.—homes. The diameter of the rotor of E-126 is 126 meters. The weight of the nacelle (gondola) is 75 tons. The tower is almost 200 meters tall. For comparison, the Eiffel tower is 300 meters tall.

Today most of the contemporary machines in the world are of the horizontal-axis wind turbine (HAWT) type; only less than 10% are of the vertical-axis (VAWT) type.

Wind turbines convert the kinetic energy of the wind into mechanical power through the use of a rotor that spins a shaft. The shaft is connected to a generator that converts the mechanical power into electricity.

The horizontal-axis type machines, in addition to the tower and the foundation include:

Blades which consist of aluminum reinforced with fiberglass. They have a heavy composite cross section which now reaches 8 cm for 2 to 3 MW production machines.

A hub which connects the blades to the low-speed shaft. The hub transmits the torque developed by the rotor blades to the shaft.

A pitch-control assembly for tilting the blades in the hub in order to properly adjust them to the so-called "angle of attack" of the wind. This means that the total surface area of the blade's assembly facing the wind changes. When the wind is weak, the surface gets bigger. When the wind is strong, each blade turns on its base and the total surface area gets smaller to reduce the wind pressure in order for the blade assembly to rotate with a constant speed.

A brake designed to stop the spinning main shaft in case of high winds. Usually a disc brake, similar to the one in automobiles.

A gearbox that converts the shaft's high-torque low-speed motion into low-torque high-speed motion that fits the electric generator's requirement. The shaft rotates on average at about 12 to 22 rpm while the generator requires approximately 1,800 rpm.

A generator, whose function is to convert the shaft torque into electricity.

A nacelle consisting of a cabin that houses all of the above mentioned elements. In modern turbines the nacelle is often of the size of a school bus or bigger. The nacelle sits atop a tower, such as a tubular steel or concrete tower or a lattice tower. Presently there is a trend is to use taller towers because the wind energy typically exponentially increases with the height.

A yaw assembly whose function is to support the entire machine assembly inside the nacelle on top of the tower and to permit its rotation for alignment with the wind.

This clearly illustrates that converting wind energy directly into electricity utilizing wind turbines involves elaborate equipment and requires high initial costs.

Prior Technology:

As the need for storing energy increased, in 1979 Hanley patented an invention in which wind energy is used to produce electricity that is used to lift water from downstream to upstream of a dam with a hydropower plant. The lifted water is stored as potential energy. Upon demand, the water is used to generate electricity.

His invention addresses the problem of storing wind energy as water potential energy. However, it has the disadvantage of converting wind energy to hydraulic power. Therefore, Hanley's invention, assuming its technical feasibility, involves elaborate equipment and requires high initial costs.

In an effort to make offshore wind power facilities even more reliable, Siemens Energy is now testing a new type of wind turbine that works without a gearbox. The main benefit of the new unit lies in its more simplified design, which requires fewer machine components, and will therefore result in lower maintenance costs and a higher level of reliability. This is especially important for offshore facilities, where turbine breakdowns are always very expensive.

The first of the wind turbines without gearboxes has been erected in 2008 in western Denmark. This turbine has an output of 3.6 megawatts (MW). With a rotor diameter of 107 meters.

The project is in a research phase for two years and will enable Siemens Energy to determine whether or not the units without gearboxes will be able to compete with conventional models and, if so, in which performance classes. Wind turbines without gearboxes are generally heavier than conventional units and also more expensive to produce.

The units without gearboxes are instead equipped with synchronous generators that are stimulated by so-called permanent magnets. They directly convert the rotor's movements into electrical energy. The two generators in Denmark boost a torque of roughly 2,500 kilonewton-meters each. By comparison, a powerful electric drive system for a car has torque of significantly less than one kilonewton-meter.

Deficiency of Prior Technology:

The advantages of wind energy are that it is renewable, nonpolluting, and free.

The disadvantages of wind energy are that it is diluted, unpredictable, and requires high initial costs. When wind is not blowing, the wind producing equipment sits idly by and there is no electricity. Wind energy is only available when the wind is blowing within a particular range of wind speeds, i.e., the turbine cannot operate at wind speeds (also called velocities) below the minimum speed and cannot safely operate above the maximum speed. Typically, the minimum speed is 7-8 km/h and the maximum speed is 60 km/h. Hence, the wind energy is only available intermittently. Further, wind power is dependent on the location because it is only seasonal in many areas of the world.

The major disadvantages of the currently used wind turbines are:

Each has its own electric generating equipment, a gearbox linked to an AC generator atop a tower. Electric equipment is very heavy and expensive and therefore initial cost is very high. Gearboxes for contemporary wind turbines are very big, heavy and expensive machineries. There are two more problems with them. Presently the market demand for them is too high and their availability is insufficient. The manufacturing capacity lags behind the demand about 2 years. And because said gearboxes and generators are big and heavy, it is difficult to lift them to the top of today's tall wind turbine towers. Also, because of their weight and size, the construction of the towers must be very robust. Another object of this invention is to eliminate them altogether in some specific embodiments.

Each has its own pitch-control assembly. Some smaller turbines are without said assembly. They have a so-called fixed pitch wind turbine rotor. A fixed pitch wind turbine rotor is a simplification at a lower cost over that of a controllable blade pitch wind turbine rotor. However, a fixed pitch rotor is harder to start because the blade pitch for efficient operation is different from that for good starting. A proposed solution to bring the wind turbine rotor up to operating speed is to use its own generator as a motor during startup. A fixed pitch turbine rotor is designed to stall in high winds in order to limit rotor torque and not to damage the generator. This invention eliminates the pitch-control assembly.

The machines are too big, tall and bulky. For example, on a large 5 MW turbine the blades alone could be over 18 tons even with the use of carbon fiber reinforcement. The blades diameter now reaches over 120 meters. The generator alone could be over 55 tons.

The tall towers and blades up to 65 meters long are difficult to transport. Transportation can now cost 20% of equipment costs.

In horizontal-axis wind turbines (HAWT), the electric generating equipment is installed atop the tower. The present day towers are very tall which makes installation difficult and sometime impossible in remote and high elevation locations because there are not adequate roads for big cranes to get there to deliver and install the heavy equipment. However, high elevations are the best for harvesting wind energy because of continuous high winds there. Besides the problems with installation, the operation and maintenance on the top of large towers is difficult. The blades are also subject to high vibrations during wind gusts and often bend or break apart. All of this shortens the equipment's life span.

The majority of HAWTs use an upwind design, with the rotor facing the wind in front of the tower. Downwind variants suffer from fatigue and structural failure caused by turbulence when a blade passes through the tower's wind shadow.

The electricity produced by the windmills must be consumed immediately. Usually wind blows harder at night. The demand for electricity at night is lowest. This creates an operational problem for the utility to whose grid the windmills are connected.

When wind is not blowing, the entire system is not working and no electricity is produced.

SUMMARY AND OBJECTS OF THE INVENTION

In the present invention the major difference from the prior art is the use of water tank reservoirs as pressure vessels for storing energy. This results in several advantages of cost and energy savings when compared to the use of standard wind turbines. At the same time water in these reservoirs could be used in times of dry periods for watering and other needs.

It is an object of the present invention to reduce the cost of converting wind energy into electricity by directly coupling wind turbines with water pumps that will lift the water from lower elevation to higher elevation where it is stored as potential energy.

Another object of the present invention is to utilize all wind potential, weak and strong and more remote and high location areas.

Another object of the present invention is to utilize any type of windmill, vertical-axis or horizontal-axis.

Another object of the present invention is to harness the wind energy in an economical way and to improve productivity and cost effectiveness of the wind turbines.

Another object of the present invention is to utilize the advantages of less expensive water pumps to generate electricity compared to the standard current wind electric generators.

Another object of the present invention is to have a hybrid wind turbine electricity generating system that converts the wind energy into kinetic water energy to directly drive a generator by means of a turbine thus avoiding the need for a gearbox.

Another object of the present invention is to eliminate the use of a nacelle in certain embodiments of the present invention as an unnecessary addition to the tower because of the reduced number and size of the components and therefore the reduced need for protection and maintenance of these components.

Another object of the present invention is to enable an easy and fast installation of the system, especially in remote locations, because of the smaller and fewer components.

Another object of the present invention is to provide a system that has the capability of storing water as potential energy in a way that said water can be circulated and returned back into the system to produce electricity for the grid again.

Another object of the present invention is to provide a system that will direct the internally, primary produced wind electricity to operate a water pump lifting low elevation water into high elevation water thus converting it into potential energy for producing secondary electricity ready for the grid or for private use.

Another object of the present invention is to provide an option for a HAWT with a downwind orientation of the blade's assembly to engage reinforcements for protecting these blades from bending and braking.

Another object of the invention is to build wind turbines with fewer and smaller components, which could be easily installed on remote locations without a need for big cranes.

Yet another object of the invention, in general, is to manage the wind energy to suit the needs for electricity consumption.

Further objects of the invention will appear as the description proceeds.

To the accomplishment of the above and related objects, this invention may be embodied in the form illustrated in the accompanying drawings, attention being called to the fact, that the drawings are schematic only and that changes may be made in the specific construction illustrated and described within the scope of the appended claims.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

FIG. 9B shows a side view of the blades assembly with the support rods of FIG. 9A.

FIG. 9C shows a side view of the blades assembly with double-sided support rods.

FIG. 9E shows an extended rotor assembly 4 of FIG. 9B or 9C with additional rods 31a, 31b & 31c on the inner side, made of rigid hard material or of steel cables of equal size, angularly and fixedly attached on its one end to each one blade or to the rods of FIG. 9B or 9C and on its other end to the rotor shaft of said wind turbine.

FIG. 9F shows an extended rotor assembly 4 of FIG. 9B or 9C with additional rods 31a, 31b & 31c on the outer side and 31d, 31e & 31f (not showing), made of rigid hard material or of steel cables of equal size, angularly and fixedly attached on its one end to each one blade or to the rods of FIG. 9B or 9C and on its other end to the rotor shaft of said wind turbine.

DETAILED DESCRIPTION OF THE PREFERRED EMBODIMENTS

Figure 1A:
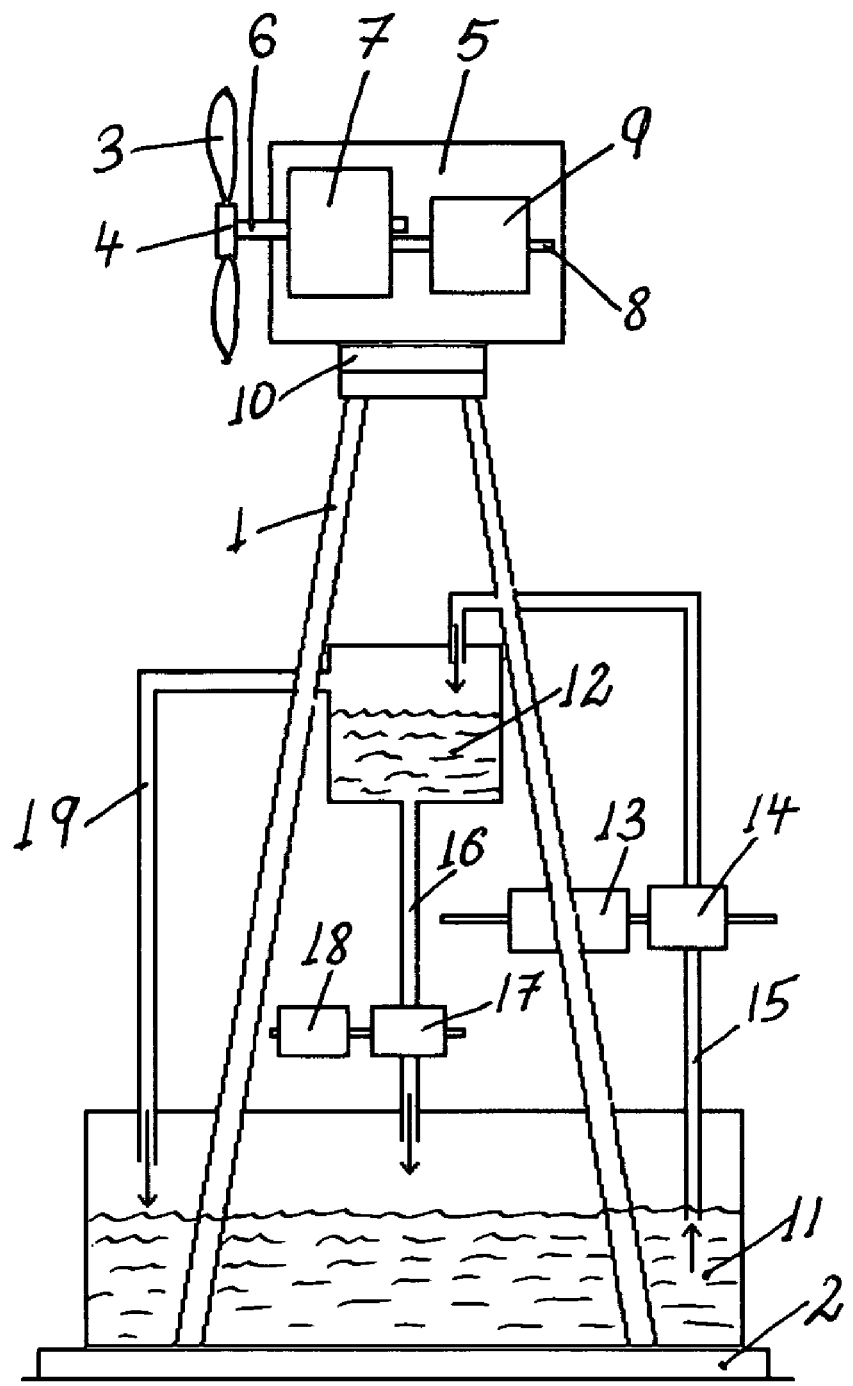
FIG. 1A schematically shows a hybrid electric generating system of the present invention utilizing a horizontal-axis wind turbine.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention is directed to wind turbine towers or tower systems configured for storing water in water containers within the tower structure itself and/or next to it and for generating electricity using the potential energy of the stored water. Briefly, the towers of modern, utility-scale wind turbine tower systems are typically metal or cement structures with a circular cross section that in addition to supporting a nacelle are adapted, according to the present invention, to store water. To achieve this functionality, the tower is modified by providing two or more water containers within the tower or near it and when necessary, reinforcing the tower structure with additional materials. Additionally, the invention builds on the proximity of water and electrical support equipment to the wind turbine to improve efficiencies by connecting this equipment to the wind turbine power converter. This arrangement avoids the losses and inefficiencies associated with many prior electricity generating designs that include multiple power conversions.

One advantage of the present system is that the need for a pitch-control assembly might be eliminated. The pitch-control assembly is again an expensive and a heavy addition to the wind turbine rotor. The present invention preferably uses a fixed pitch wind turbine rotor. A fixed pitch wind turbine rotor offers a simplification at lower cost over that of a controllable blade pitch wind turbine rotor. A fixed pitch turbine rotor is designed to stall in high winds, to limit rotor's torque. Therefore, the generator must be capable of absorbing the maximum power output the rotor can generate. The rotor in turn must have the capability to not critically overspeed in the event the load is removed from it. The present invention does that by continuously circulating water. Thus, in a sense, the load could never be removed from it.

An even more important advantage of the present invention is that it produces more power because any wind, weak or strong, may be harnessed. Wind blows at variable speed, sometimes gusting, while the electric generators powered by the wind turbine must rotate at a constant speed because the AC current generated must have a constant frequency. This requires that the blades of the wind turbine be automatically adjusted in order to rotate at a constant speed. This is done by the pitch-control assembly. But the pitch-control doesn't do all the job expected from it. With a conventional wind turbine, when the wind is weak, the turbine doesn't work because there is a minimum starting wind velocity needed. When the wind is too strong, at the maximum wind velocity, the turbine has to be stopped because it will bend or break the blades or it will turn the generator at higher rotations, which will disable it from delivering the required 50 to 60 Hz of AC power for the grid utility system.

The preference for using a fixed pitch wind turbine rotor in the present invention is not only because it is cheaper but mainly because it can harness more wind energy. This type of rotor is turning faster during high winds as opposed to a rotor with pitch-controlled blades, which keeps on turning with the same speed in all conditions. This means that the pitch-controlled blades are missing much of the energy that could be harnessed during high winds. The energy of the wind doubles when the speed doubles. The fixed pitch rotor captures that energy which can double many times between low and high speeds. The present system then conserves that energy for later use.

The pitch-control rotor misses on all of that action. It may keep on turning during high wind and it creates an illusion that it is working hard but it is actually capturing the same amount of energy because it is rotating with the same speed as if the wind speed was low. Most of the wing energy, which we don't see just by looking at it, is lost between the blades.

The use of water containers as pressure vessels for storing energy results in a cost and energy savings when compared to the use of standard wind turbines. The incremental cost of modifying the tower to store water is significantly less than providing separate water pressure equipment (such as water dams). Energy is saved because the volume provided by a typical tower is so large that a large quantity of mass of water can be temporarily stored at lower expense for later use and could be continuously circulated.

Figure 1B:
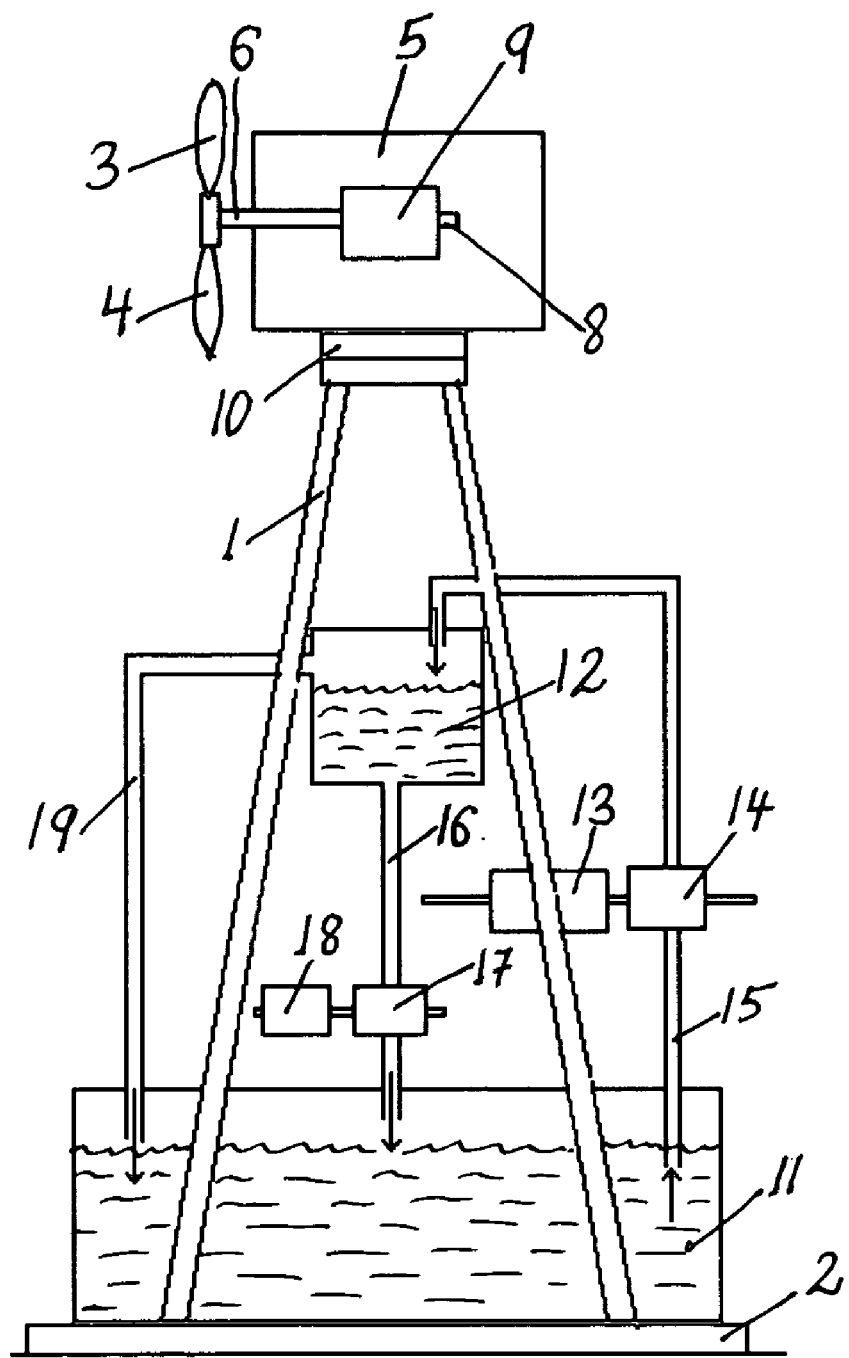
FIG. 1B is identical to FIG. 1A except that the gearbox 7 is missing.

The following description begins with a discussion of a system for storing water within a wind turbine tower with reference to FIGS. 1A & 1B. The system also includes features for generating electricity using the stored water, and for distributing the produced electricity. The description then continues with reference to the rest of the FIGURES with more particular discussions of wind turbine tower systems configured according to the invention, showing various techniques for modifying towers for storage and for making use of the stored water. Finally, with reference to FIGS. 4A, 7A & B and 8A & B a method of designing, fabricating, and operating a wind turbine tower system with in-tower and in-building water storages and additional tower(s) with water storage reservoirs connected to the primary wind turbine is described in detail. At the end, in series of FIG. 9, needed reinforcements of a fixed blade assembly are shown.

With reference to FIG. 1A the essential concept of the present invention and the means by which it is intended to operate may be appreciated. FIG. 1A shows a wind turbine assembly comprising a vertically aligned tower 1 firmly attached to the base 2. On the top of the tower 1 there is the blades section, which comprises plurality of turbine blades 3, attached to a hub 4. This assembly, the blades with the hub together, is called rotor. Said rotor, for the present invention, is preferably a fixed pitch rotor. There is the nacelle 5 housing the first shaft 6, which transmits the low-speed, high-torque power from the blade's rotor hub 4 to the gearbox 7. The gearbox 7 is basically a transmission which converts the power from said first shaft 6 to the second shaft 8, and transfers the now high-speed, low-torque rotation of shaft 8 to the primary power generator 9. The average speed of the low speed input shaft 6 may vary from 12 to 60 rpm but the required speed for an AC generator to produce electricity is between 1,200 to 3,600 rpm. Therefore the high-speed output shaft 8 turns with about this many rotations depending upon the wind conditions and the generator requirements.

If the generator 9 is a DC generator then the above ratio could be different. A DC generator can produce electricity at any speed. For our purposes the DC generator is preferable but because there are already so many wind turbine systems on the market with an AC generator incorporated in them and ready for use, an AC generator is acceptable and could be adapted into the system of the present invention.

If the whole system is built from scratch, then for economic purposes the generator 9 should be a DC generator. The reason is that a DC generator may produce electricity on both low and high-speed shaft rotation thus it can work with low and high winds. For the same reason it doesn't need a pitch-control and it can work with fixed pitch blades. This allows reducing the size of the gearbox 7 or even eliminating it entirely as shown in FIG. 1B.

At 10 a yaw assembly is permitting a horizontal rotation of the nacelle for alignment with the wind. The yaw assembly is controlled by an electronic control box (not shown) which tells it which way and how much to turn. The control box gets its data from an anemometer and a wind vane (not shown). The anemometer measures the wind speed and the wind vane measures the wind direction.

At 11 a lower water tank reservoir is shown. This reservoir may be inside the tower, next to the tower, around the tower or underground. At 12 an upper water tank reservoir is shown (because it is smaller we will call it a container). This container stores water as a potential energy. When wind is blowing the primary electric power generator 9 produces electricity which turns, via electric wires (not shown), electric motor 13. Electric motor 13 is coaxially linked to pump 14, which draws water from reservoir 11 and through conduit 15 delivers it to the upper water tank 12. Said water then under pressure passes through the propeller of water turbine 17 via the conduit 16 with a nozzle at the lower end (not shown). The falling water then releases its potential energy into kinetic energy of the spinning turbine shaft. The turbine 17 turns the auxiliary, coaxially connected to it, shaft of an AC generator 18 which then produces electricity for the grid or for private use. After utilizing its kinetic energy the water continues on moving and it is collected back into the lower reservoir 11 ready to be reused.

In the present invention, because the blades might be fixedly attached to the hub, they could be set to start turning the turbine at a lower wind speed and then keep on turning it at high speeds without having to stop it. A very high wind speed will turn the rotor faster and in turn it will deliver more primary electricity for the internal use of the system, which will then turn faster the pump 14 and overflow the upper water container 12. However, the overflow water will be returned unused and collected back into the lower reservoir 11. At the same time pressure on the turbine 17 and the adjacent second generator 18 will remain constant, thus the same frequency of electricity will be produced at any time, regardless of the wind speed. The rotor doesn't have to stop rotating.

Therefore, by utilizing the present invention, longer working hours will be achieved, compared to the conventional wind turbines. Also more remote or high locations for installation of such turbines could be reached because of the extended working land area of the present system. For example, some places are not windy enough for the contemporary wind turbines in use and others are too windy. Other places are located on a high altitude.

Figure 1C:
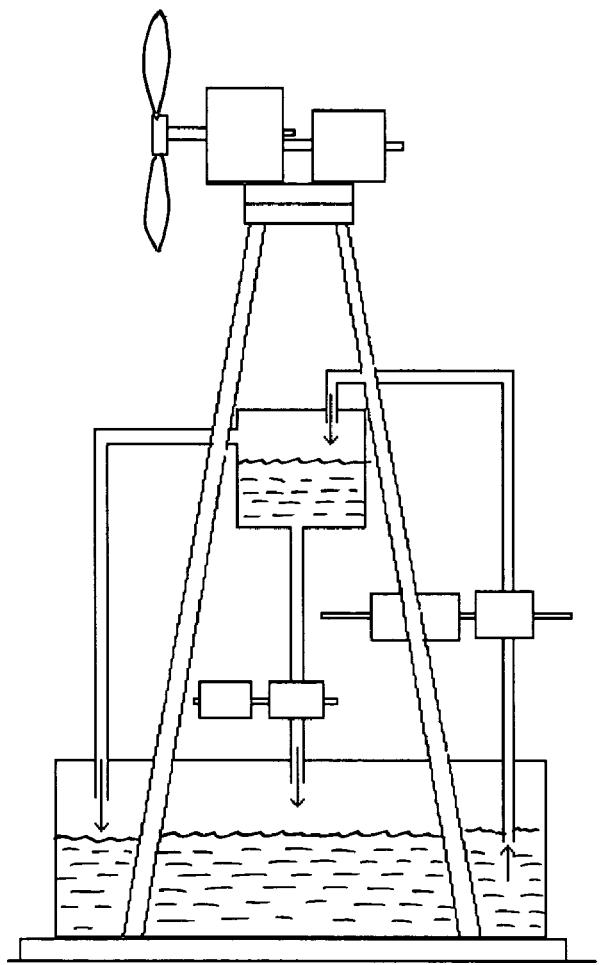
FIGS. 1C & 1D are examples of some embodiments of the hybrid electric generating system of the present invention without the nacelle.
Figure 1D:
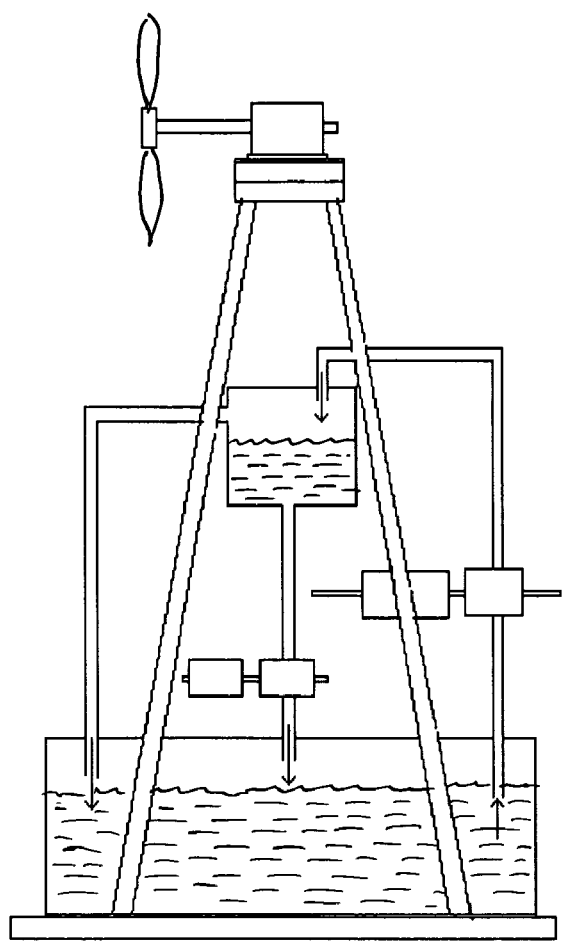

With reference to FIGS. 1C & 1D in the drawings a vertical-axis wind turbine is shown, according to the present invention, the nacelle on top of the main tower is removed because of the smaller number and size of the components compared to a standard wind turbine. This may be applied to all embodiments of the invention.

Figure 1E:
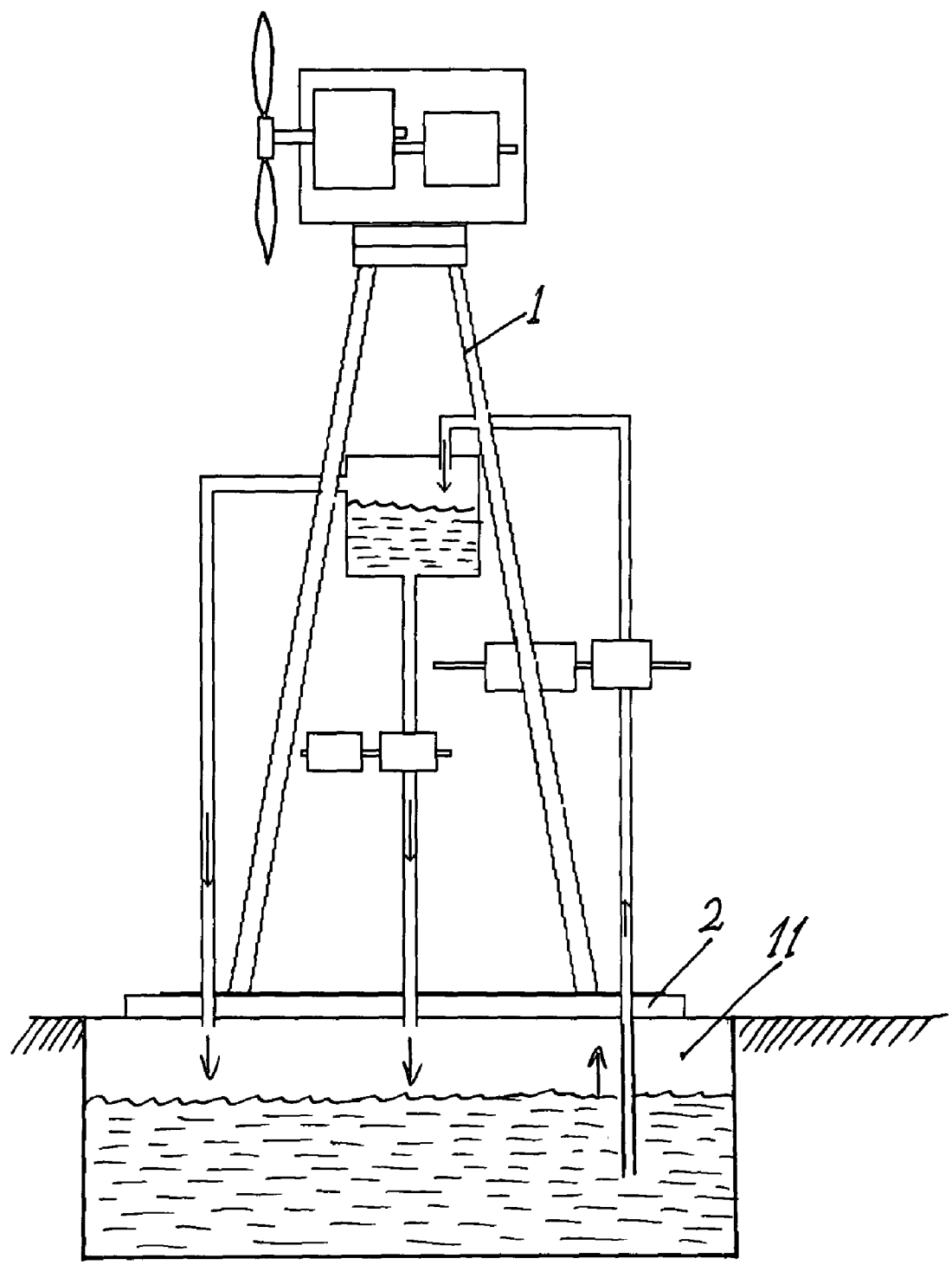
FIG. 1E schematically illustrates the hybrid electric generating system of the present invention wherein the large lower water reservoir is positioned underground, under or near the main tower.

With reference to FIG. 1E in the drawings a vertical-axis wind turbine is shown according to the present invention wherein the main reservoir 11 is positioned underground, under or nearby the wind tower. This may be applied to all of the embodiments of the invention.

Figure 2A:
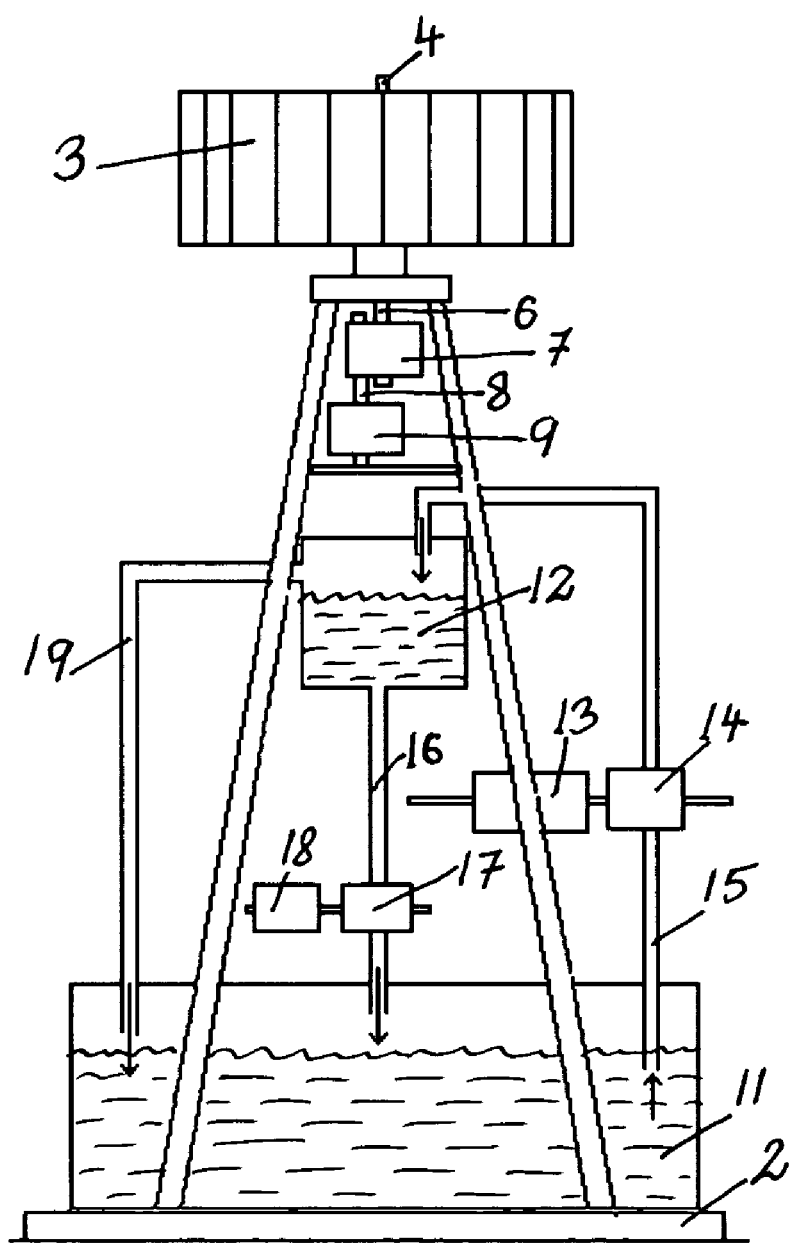
FIG. 2A schematically shows a hybrid electric generating system of the present invention utilizing a vertical-axis wind turbine.
Figure 2B:
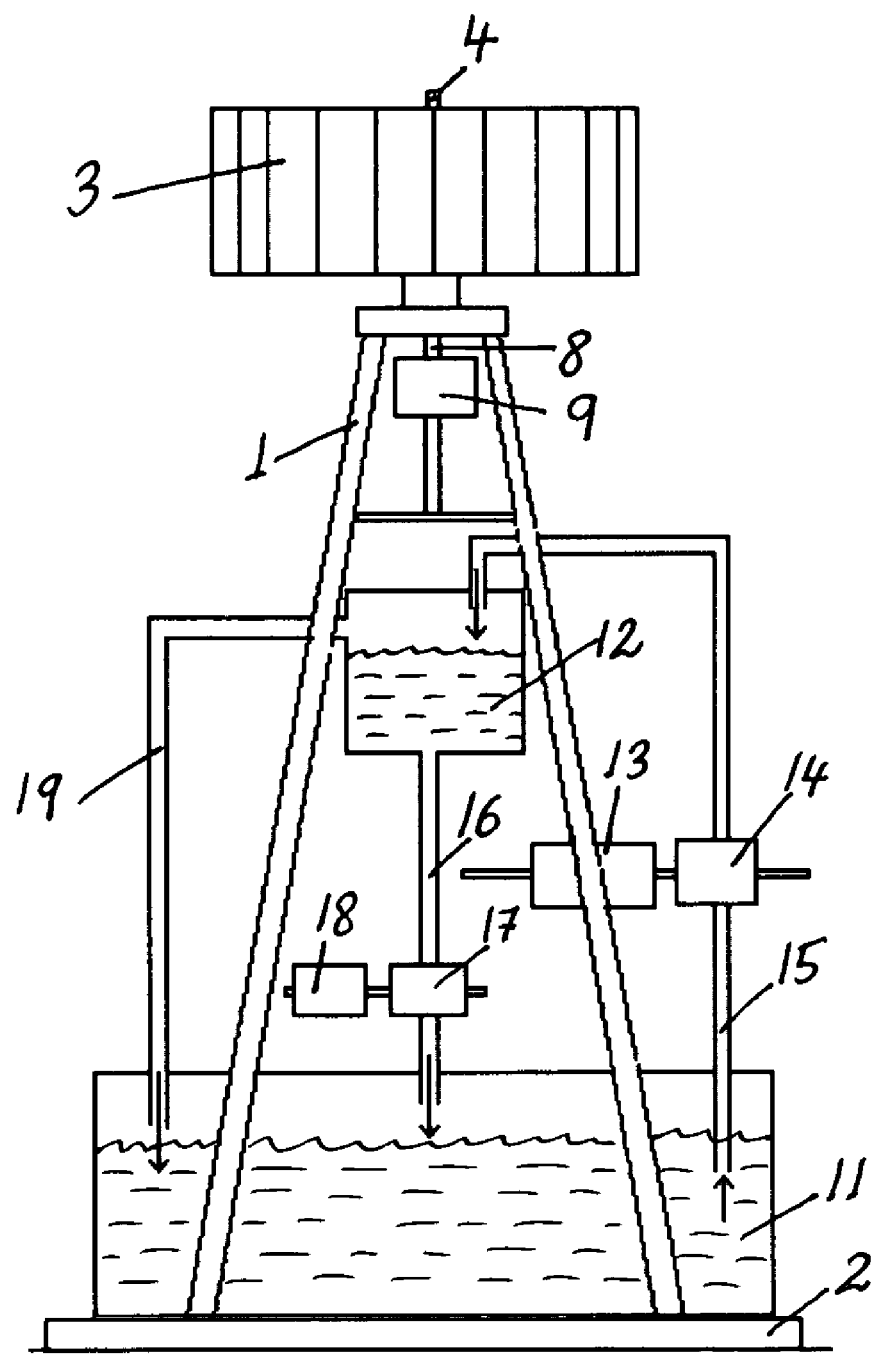
FIG. 2B is identical to FIG. 2A except that the gearbox 7 is missing.

With reference to FIGS. 2A & 2B in the drawings a vertical-axis wind turbine is shown, according to the present invention. Except for the blades and the vertical shaft, everything else in this embodiment is the same as in FIGS. 1A & 1B. The shaft of the rotor assembly in this embodiment is vertical and it is connected to shaft 6 of the gearbox 7, (FIG. 2A) or directly connected to shaft 8 of the generator 9 (FIG. 2B). In this embodiment the gearbox 7, (FIG. 2A) and the generator 9 are also positioned vertically inside the tower's body. In the embodiment of FIG. 2B the gearbox 7 and is eliminated and there is no need for a yaw assembly.

Figure 3A:
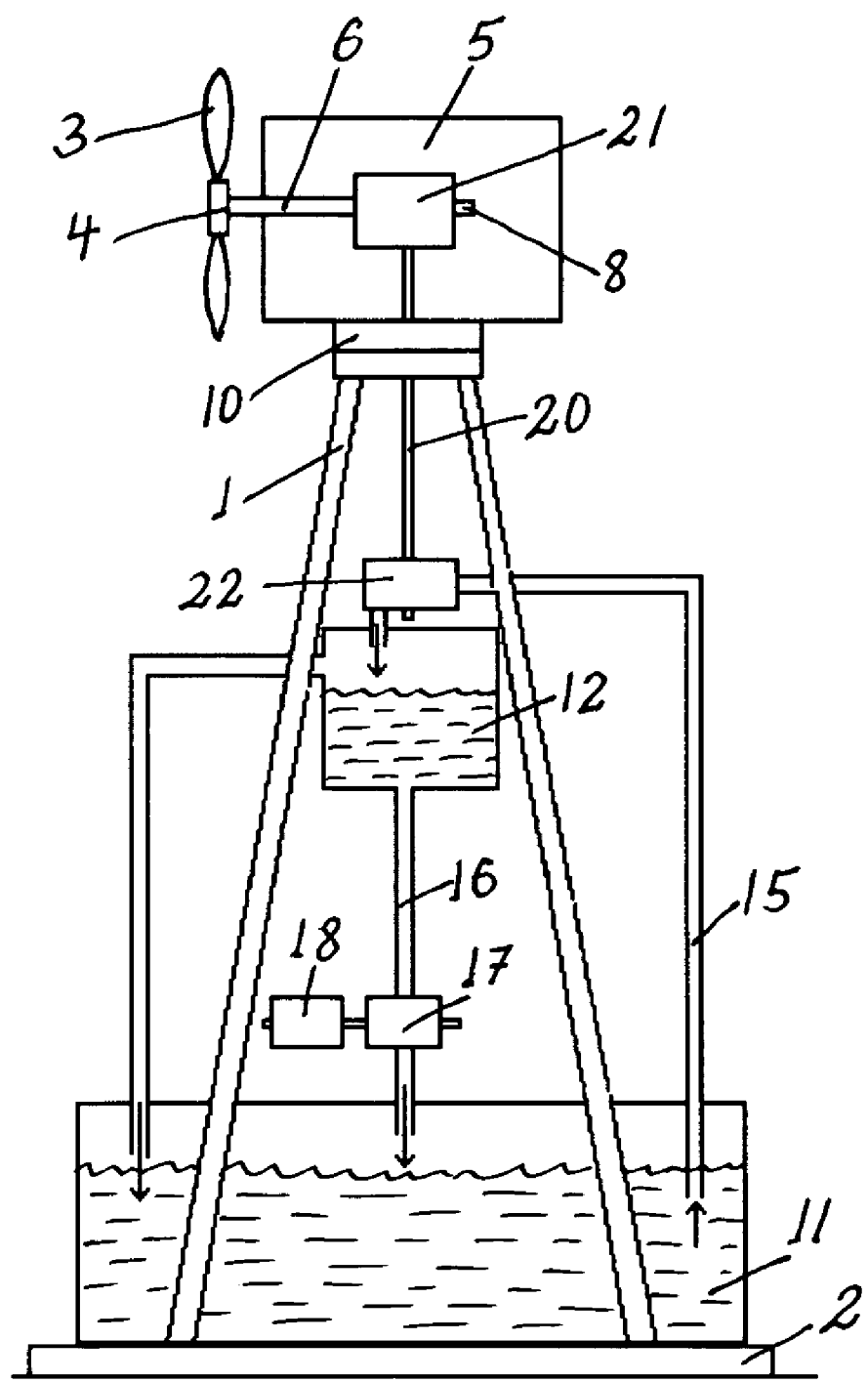
FIG. 3A schematically shows a hybrid electric generating system of the present invention utilizing a horizontal-axis wind turbine with a direct rotor to pump mechanical connection for motion transfer utilizing a differential type gearbox wherein the two shafts of said gearbox form a 90 degree angle.

With reference to FIG. 3A in the drawings a horizontal-axis wind turbine according to the present invention is shown. In this embodiment everything is the same as in FIG. 1A except that the gearbox 7 and the generator 9 on the top of the tower assembly 1 are missing and motor 13 and water pump 14 connected to the lower reservoir 11 are missing. Instead, shaft 6 from the blade assembly transfers its horizontal rotation into vertical rotation of shaft 20 via a differential type gearbox 21. In this type of gearbox the two shafts 6 and 20 form a 90 degree angle. Shaft 20 passes through the middle of the yaw assembly 10. Said shaft 20 then transmits its rotation directly to the water pump 22. The water pump 22 is connected via the conduit 15 such as a pipe or a hose to the lower reservoir 11. When the wind is blowing the rotation of the blade assembly is directly, mechanically transmitted to the pump 22 which then pumps water from the lower reservoir 11 via said conduit 15 and delivers it into the upper container 12. All other operations of this embodiment are the same as described for the embodiment of FIG. 1A.

Figure 3B:
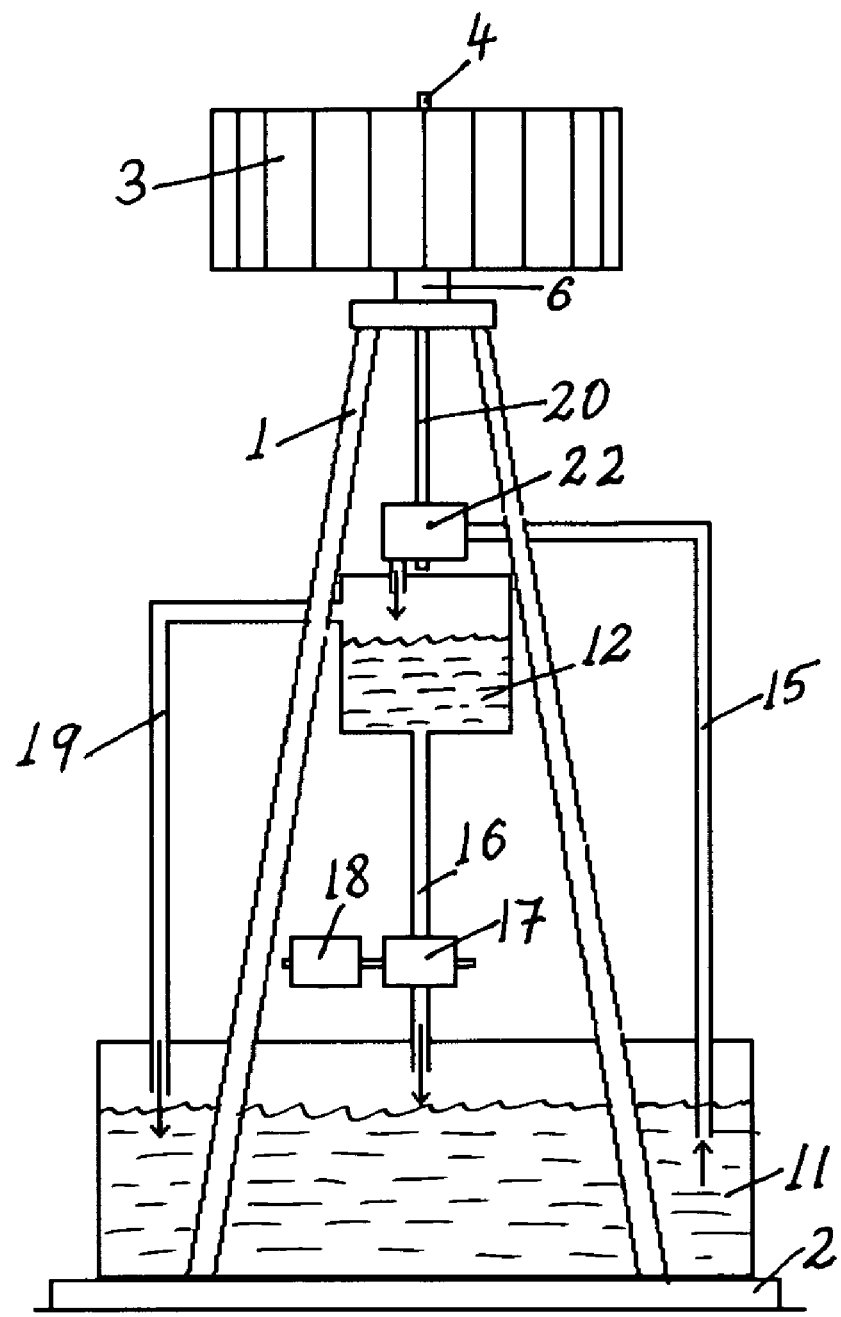
FIG. 3B schematically shows a hybrid electric generating system of the present invention utilizing a vertical-axis wind turbine with a direct rotor to pump mechanical connection and not utilizing any gearbox. Everything is the same as in FIG. 3A except that the gearbox 19 and the nacelle 10 are missing.

In FIG. 3B an embodiment of a vertical-axis wind turbine is shown, according to the invention. In this embodiment everything is the same as in FIG. 3A except that the blades are vertical and the rotor is vertical. The differential type gearbox 21 and the yaw assembly 10 have been eliminated because there is no need for them. The turbine has a vertical axis 6, which is linked to shaft 20. Said shaft 20 directly turns the water pump 22. The rest of the operation of this embodiment is the same as for the FIG. 3A.

Figure 4:
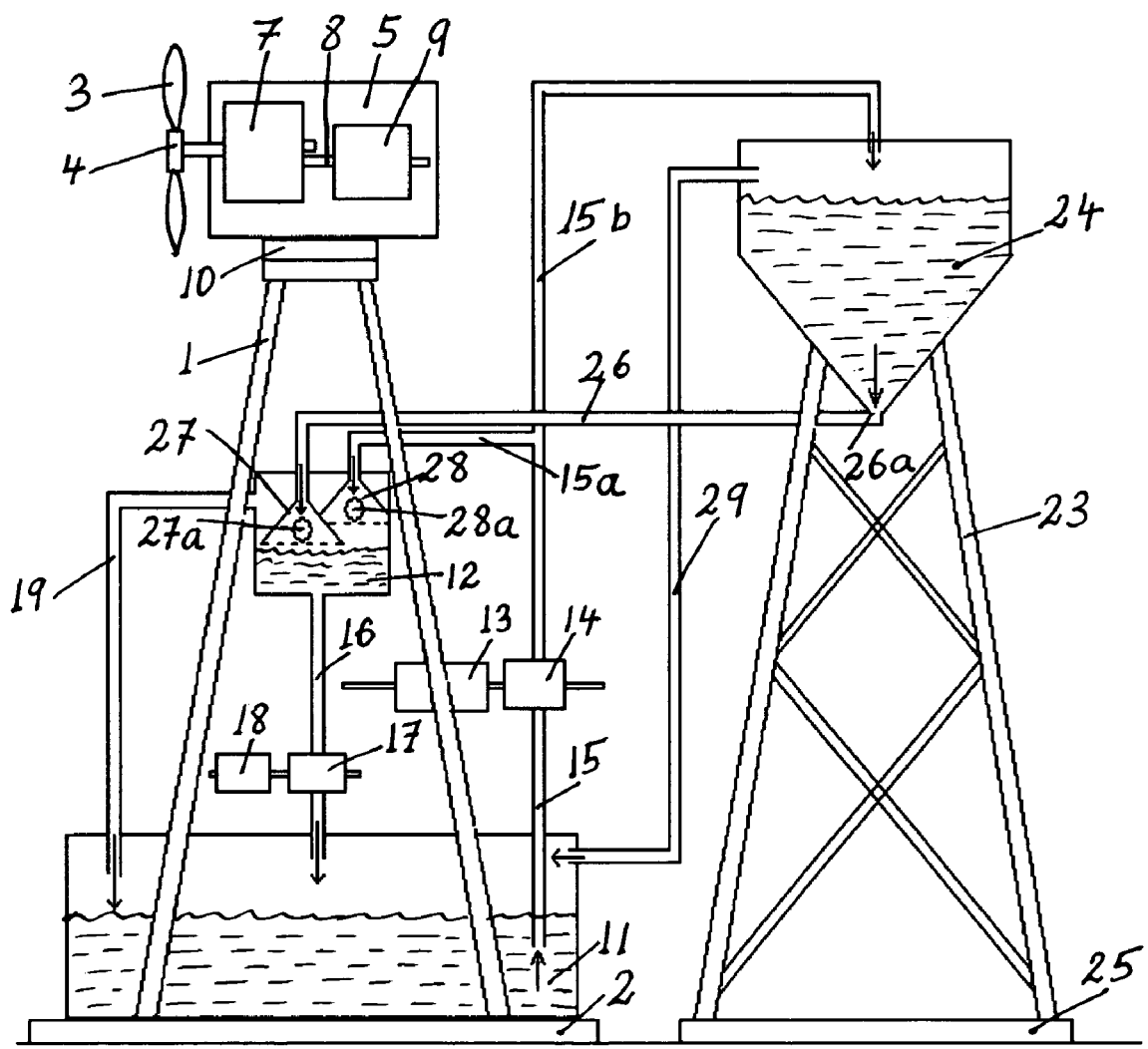
FIG. 4 schematically shows a hybrid electric generating system of the present invention utilizing a horizontal-axis wind turbine of FIG. 1 connected via several conduits to a water storage tower with a large water reservoir atop.

With reference to FIG. 4 in the drawings a different concept of a wind turbine is presented. Herein, next to the basic concept of previous FIG., there is a water storage tower 23 with an elevated large water reservoir 24 and a foundation 25. The volume of reservoir 24 is many times the volume of container 12 but smaller then reservoir 11. Reservoir 24 stores water as potential energy for times when there is low wind or no wind.

The embodiment in FIG. 4 works as follows: When the wind is blowing and the turbine's rotor is turning an electrical transmission line delivers electricity from the generator 9 to motor 13. Said motor turns the water pump 14, which pumps water from the lower reservoir 11 and via conduit 15 and 15a deposits it into the container 12. When water reaches its maximum predetermined level in container 12 it lifts the floating ball 28a, or similar means, and closes the end valve 28 of conduit 15a. Water then continues via conduit 15b up into reservoir 24. The valve 28 constantly opens and closes because the water level in said container 12 constantly rises and drops since said water is used to run the hydro-turbine 17 after which it is discharged back into reservoir 11 for reuse. When the water level drops, the valve 28 opens and more water enters inside the container 12, which again rises the water level and closes the valve.

When the wind is strong pump 14 gets sufficient power to pump water from container 11 which is enough to fill the container 12 up to the level which closes valve 28. This means that no more water enters container 12 and water continues up conduit 15b to reach the reservoir 24 for storage and for later use.

When the water level in container 12 is low again, water from reservoir 24 leaves said reservoir and via conduit 26 is delivered back into container 12. The level of the opening 26a on the bottom of reservoir 24, where water enters conduit 26, is always higher then the permitted predetermined maximum water level in container 12. There is a funnel-shaped valve attachment 27 at the other end where conduit 26 enters container 12. There is a floating ball 27a (FIGS. 5A & 5B) or a flowing funnel-shaped device 27b (FIGS. 6A & 6B) inside said valve attachment 27 for closing said valve in order to prevent water from conduit 26 to flow into said container when necessary.

When water is drained from reservoir 24 into container 12 and water level in said container rises, the water lifts the floating ball 27a, or the funnel-shaped device 27b, which then closes the valve 27 and no more water can enter into said container 12. This keeps automatically the amount of water inside said container at the same level, which means that the pressure on the hydro-turbine 17 is always the same. Said valve 27 constantly opens and closes in order to keep the water level quite even. Thus said hydro-turbine 17 revolves with the same speed and always delivers an even AC current through the electric generator 18 for the grid network no mater what the water pressure in reservoir 24 is.

At a time when there is no wind and the rotor assembly of the wind turbine rotor is not turning, the AC generator 18 will still delivers electric power for the utility grid until reservoir 24 is empty.

On the other hand, when at night the demand for electric power is low but there is wind, the connection to the utility power grid could be shut down. This means that hydro-turbine 17 will stop revolving, no water will be passing down conduit 16 and container 12 will quickly fill up. This will first close valve 27 and then valve 28, which is positioned higher then valve 27. Closing the valve 28 will prevent water from draining from reservoir 24 into container 12. Because of the available wind, the blade assembly of the rotor 4 will keep on turning. The pump 14 then will keep on pumping water from reservoir 11 via conduits 15, which is split into 15a and 15b. But valve 27 already closed 15a therefore water will continue via 15b only up towards the large water reservoir 24 for storage. Thus the system will be accumulating water as potential energy for later use.

If the wind is too strong, the water may overflow the large reservoir 24. In that case the excess water will be returned unused via the overflow conduit 29 back to the primary reservoir 11.

Figure 5A:
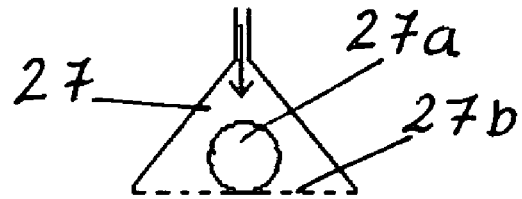
FIG. 5A schematically shows a funnel-shaped valve with a floating ball inside, during a low water level, for closing the valve if the water level inside container 12 rises.
Figure 5B:
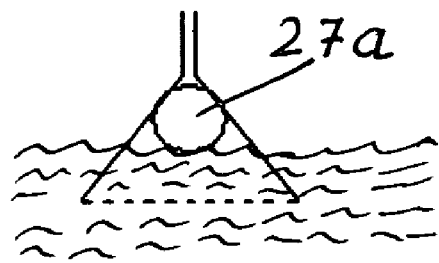
FIG. 5B schematically shows a funnel-shaped valve with a floating ball inside, closing said valve during a high water level.
Figure 6A:
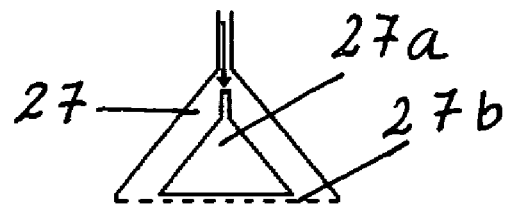
FIG. 6A schematically shows a funnel-shaped valve with a floating funnel-shaped device inside, during a low water level, for closing the valve if the water level inside container 12 rises.
Figure 6B:
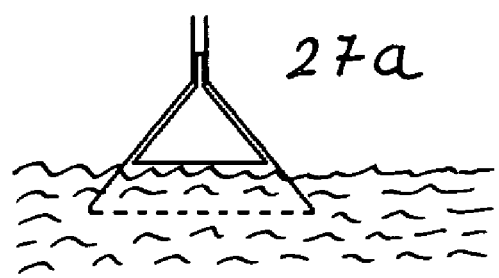
FIG. 6B schematically shows a funnel-shaped valve with a floating funnel-shaped device inside, closing said valve during a high water level.

In FIGS. 5A&B and 6A&B the funnel-shaped valve 27 (28 is the same) and the floating ball 27a or the floating funnel-shaped device 27b inside are shown up and down. When the water level is high it lifts them up and they close the valves. When the water level is low, they drop down and open the valves. They are prevented from escaping from the valves by the grid attachment 27c at the bottom of the valves. Said grid attachment 27c however allows the water to freely enter and leave said valves.

Figure 7A:
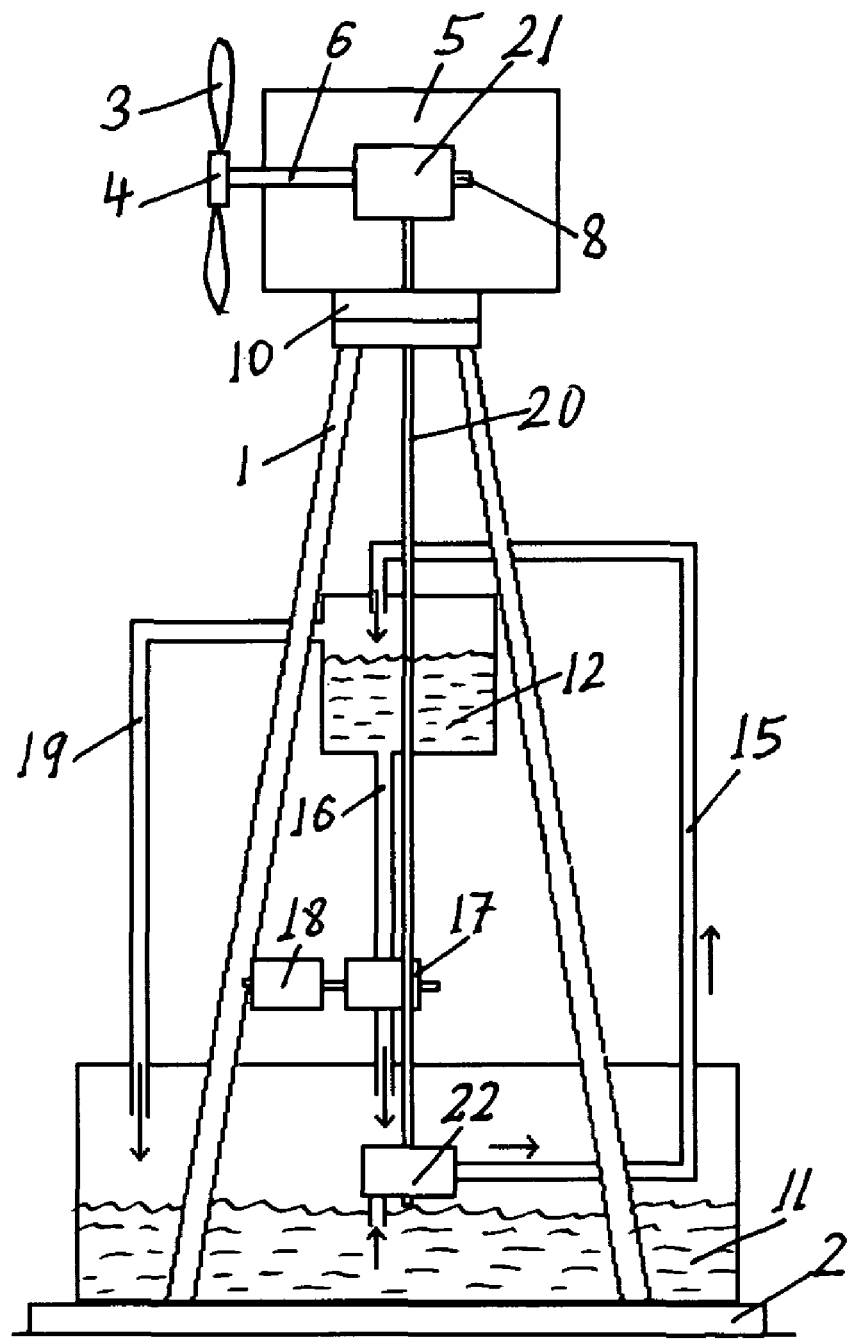
FIG. 7A shows the same wind turbine as in FIG. 3A. The only difference is that water pump 22 is now low-positioned inside or near reservoir 11 and shaft 20 is extended downwards to directly connect with said pump.

In FIG. 7A the wind turbine is the same as in FIG. 3A. The only difference is that water pump 22 is now positioned low, inside or near reservoir 11 and shaft 20 is extended downwards to directly connect with said pump. The advantage of this arrangement is that when said pump 22 is down, it does not transfer its vibrations directly to the tower. The disadvantage is that shaft 20 is too long.

Figure 7B:
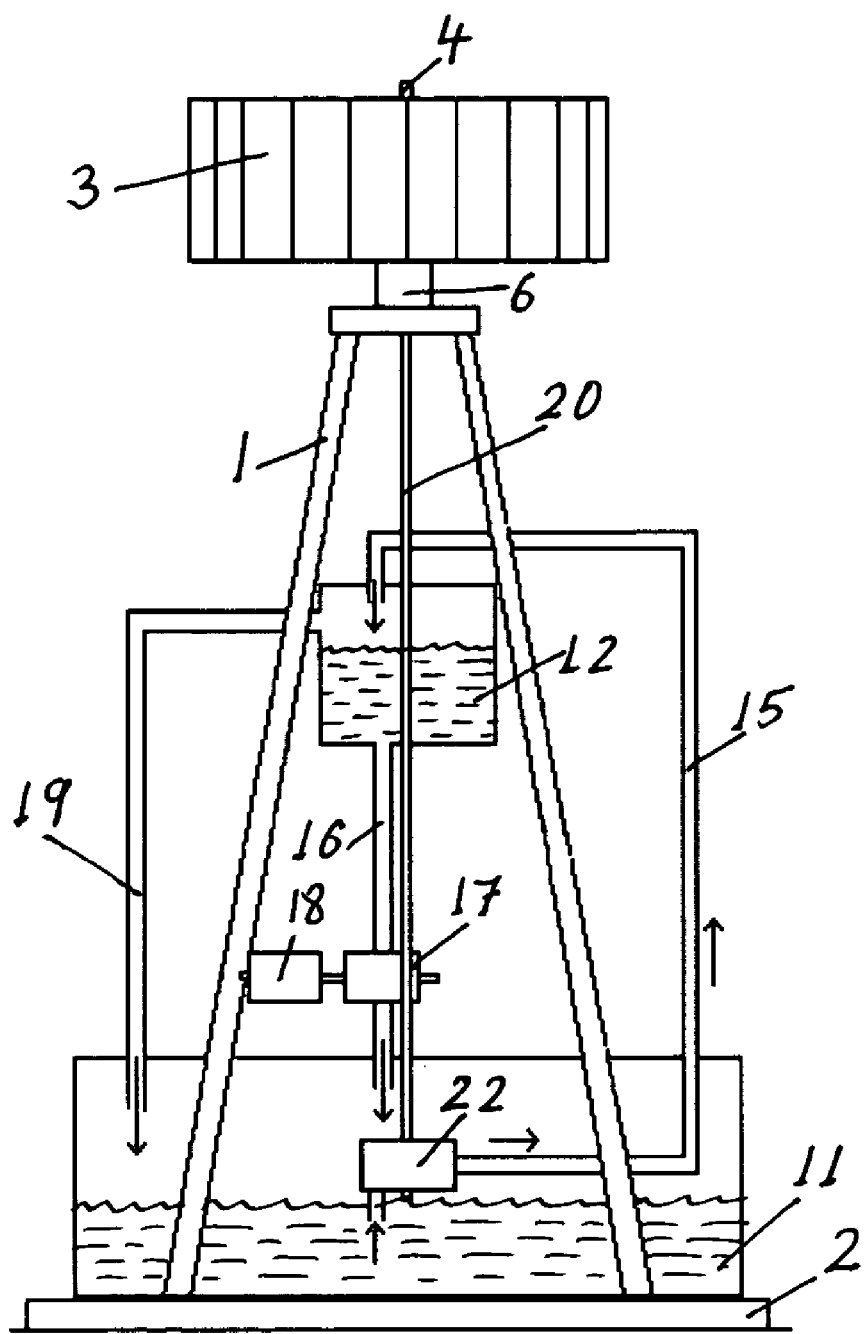
FIG. 7B features a vertical-axis wind turbine. Everything else is the same as in FIG. 7A.

FIG. 7B features a vertical-axis wind turbine. Everything else is the same as in FIG. 7A.

Figures 8A, 8B:
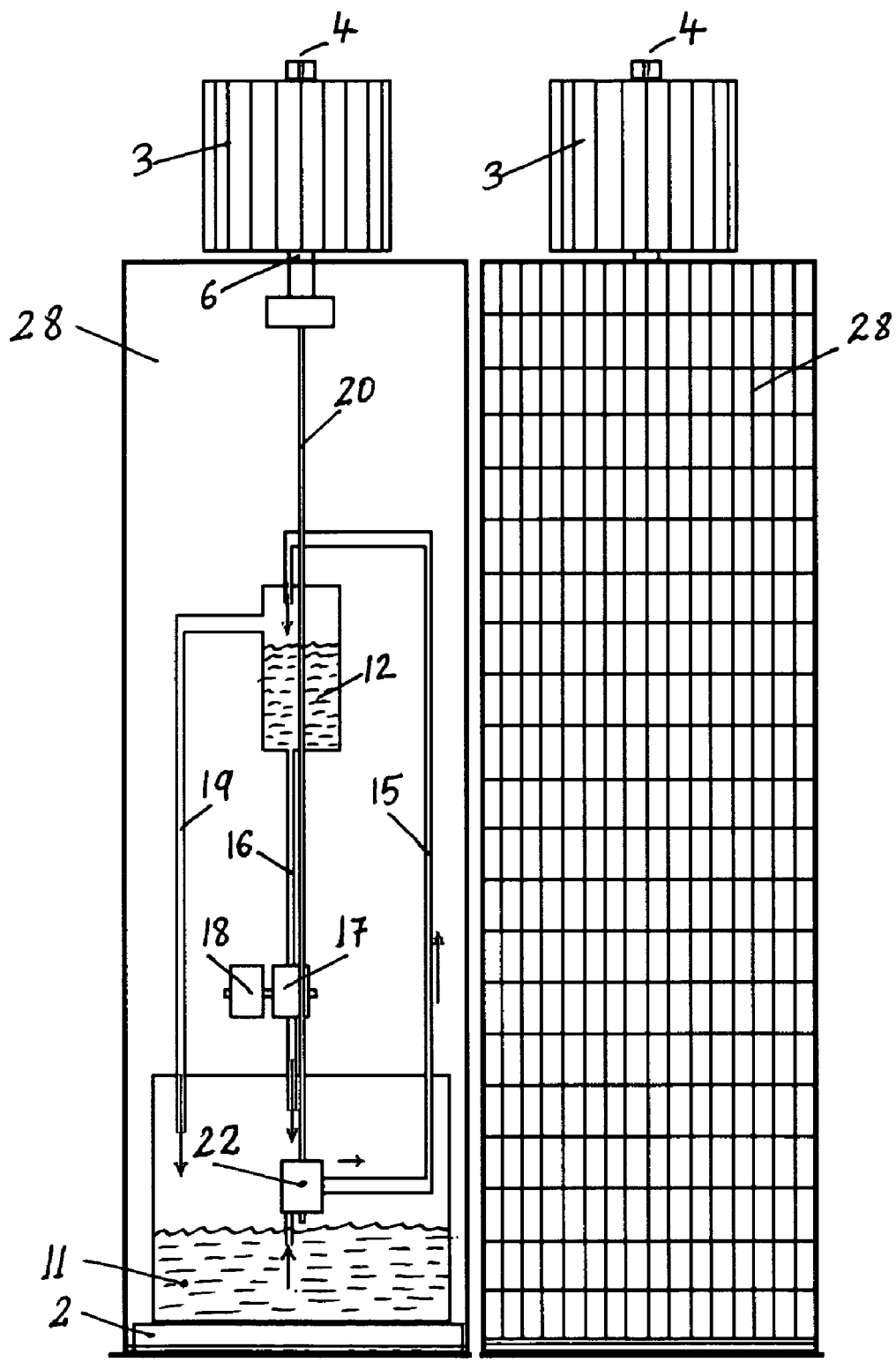
FIGS. 8A & 8B show a building 28 within which the system of the present invention is installed using a vertical-axis blade assembly (specifically of FIG. 7B). On FIG. 8A the building is shown in transparent view in order for us to see the system of the present invention inside the building.

FIGS. 8A & 8B show a building 28 utilizing the system of the present invention. In FIG. 8A said building 28 is transparent and we can see the system of the present invention installed inside. Specifically the embodiment of FIG. 7B of a vertical-axis wind turbine is presented but any of the embodiments of the present invention could be utilized. On the top of the building there is a vertical-axis propeller with blades 3, the hub 4 and the shaft 20. All of them form the rotor which via said shaft 20 transfers its rotation, when there is wind, to the pump 22. Said pump lifts water from the lower reservoir 11 into the upper container 12. Said water then runs down conduit 16 and by turning the hydro-turbine 17 and the generator 18 produces electricity for the consumption of the building. If there is an excess of electricity it might be delivered back to the utility grid. Thus buildings with such systems could become partially or fully self sufficient in their own electric power consumption and can even produce electricity for outside use.

On the middle or above the middle floors of the building, instead of container 12, one or more floors could be used as water containers. Presently some tall buildings use one or more middle floors as water containers for a better stability in case of an earthquake. It has been tested that in case of an earthquake middle floors accommodating such water tanks absorb the vibrations of the quake and the buildings emerge stronger afterwards. In the present invention water inside the middle or top floors may serve both purposes. At the same time such floors with water container could be connected to water sprinklers and could be useful in case of fire.

Figure 9A:
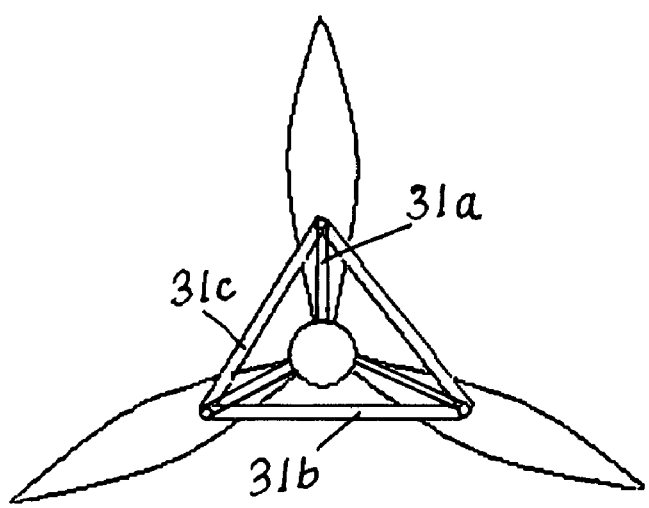
FIG. 9A shows a rotor assembly 4 of a horizontal-axis wind turbine with blades reinforcement support rods 29a, 29b and 29c.

FIG. 9A shows a rotor assembly 4 of a horizontal-axis wind turbine with blades reinforcement support attachments 29a, 29b and 29c and a tower 1. These blades reinforcement support elements consist of rods of equal size made of rigid hard material such as plastic, wood or metal. They could be flat, round or square tubes with holes 30a, 30b and 30c at each end for bolting them to the blades. The supports rods are fixedly attached to the blades with bolts going through the blades via holes exactly in the axial middle of the blades. All the holes should be exactly on the same place on each blade so that the blade's assembly is evenly balanced. If necessary, support rods may be attached to both sides of the blades and fastened with the same bolts. Blades reinforcements are necessary in case of strong and gusty winds to support the blades and protect them from bending, breaking or falling apart. The blades of the present invention will occasionally turn with speeds higher then normal and if they are not reinforced and properly balanced the whole assembly may begin wobbling and then break apart from the tower. That's why it is extremely important that these reinforcement rods are of equal size and that they are attached exactly in the axial middle of each blade. However, this type of support could only be installed on a fixed blade rotor because once they are installed said blades cannot pivot like the blades of a pitch-control rotor assembly.

FIG. 9B shows a side view of the blades assembly with the support rods of FIG. 9A.

FIG. 9C shows a side view of the blades assembly with double-sided support rods.

Figure 9D:
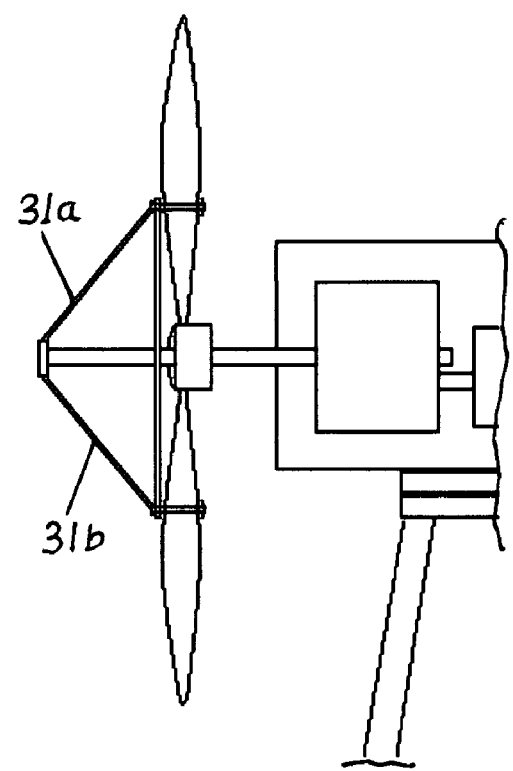
FIG. 9D shows an extended rotor assembly 4 of FIG. 9B or 9C with additional rods 31a, 31b & 31c on the outer side, made of rigid hard material or of steel cables of equal size, angularly and fixedly attached on its one end to each one blade or to the rods of FIG. 9B or 9C and on its other end to the rotor shaft of said wind turbine.

FIG. 9D shows an extended rotor assembly 4 of FIG. 9B or 9C with additional rods 31a, 31b & 31c on the outer side, made of rigid hard material or of steel cables of equal size, angularly and fixedly attached on its one end to each one blade or to the rods of FIG. 9B or 9C and on its other end to the rotor shaft of said wind turbine. During strong winds the fixed blades of the present wind turbine may come under such pressure to cause them to bend or break. These angular attachment elements are supposed to hold the blades giving them additional strength and support.

FIG. 9E shows an extended rotor assembly 4 of FIG. 9B or 9C with additional rods 31a, 31b & 31c on the inner side, made of rigid hard material or of steel cables of equal size, angularly and fixedly attached on its one end to each one blade or to the rods of FIG. 9B or 9C and on its other end to the rotor shaft of said wind turbine.

FIG. 9F shows an extended rotor assembly 4 of FIG. 9B or 9C with additional rods 31a, 31b & 31c on the outer side and 31d, 31e & 31f (not showing), made of rigid hard material or of steel cables of equal size, angularly and fixedly attached on its one end to each one blade or to the rods of FIG. 9B or 9C and on its other end to the rotor shaft of said wind turbine.

Figure 9G:
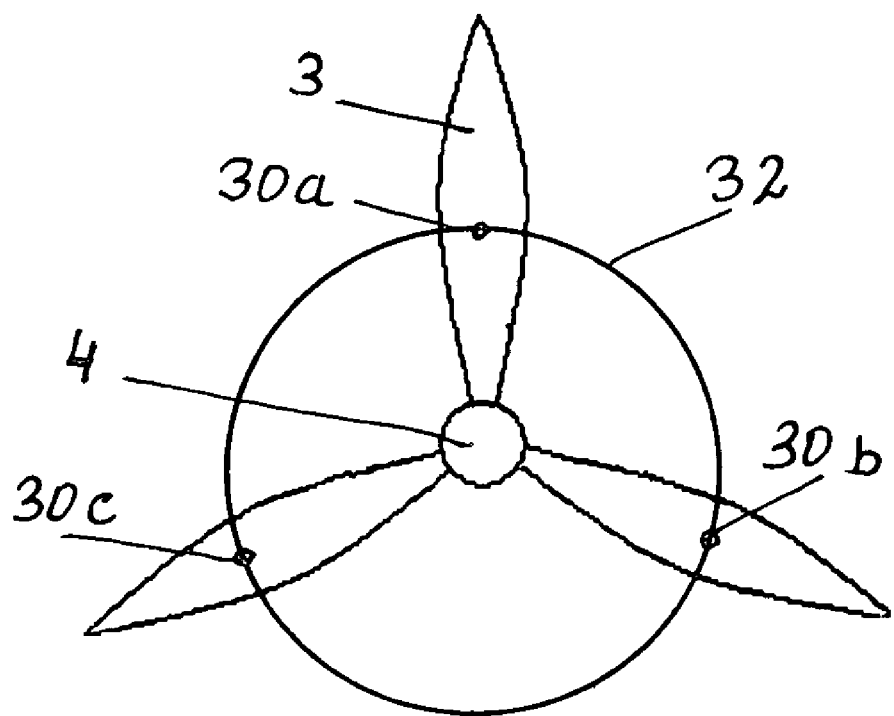
FIG. 9G shows blades reinforcement support where instead of rods, the support consists of one continues circular piece 32 in the form of a wheel.

FIG. 9G shows blades reinforcement support wherein instead of rods, the support consists of one or more concentric circular pieces 32 in the form of a wheel. These wheel-like elements might be installed on both sides of the blades.

Figure 10:
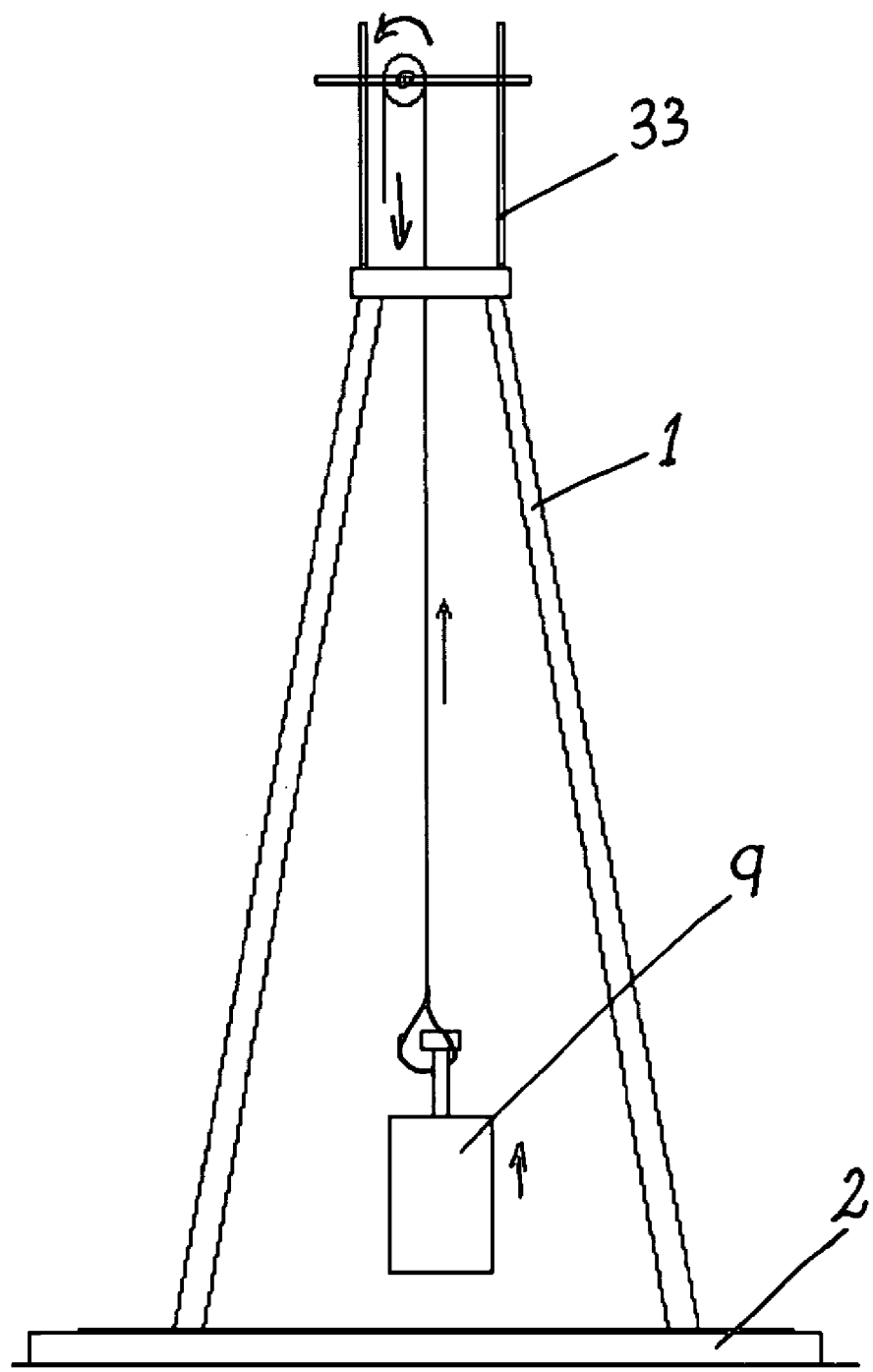
FIG. 10 illustrates a method of building a wind turbine without a crane.

FIG. 10 schematically shows a method of building and installing the components of a wind turbine without using a crane. After the tower is erected, the different components, because of their smaller size, could be installed through the inside of the tower. A temporarily lattice construction 33 is build on the top of the tower and different components, like the generator 9 on the picture, are tied up with a metal rope or a cable and lifted to the top. After all components are installed the temporarily construction on the top could be removed. This method will enable a more economical construction of wind turbines because the need for a crane or other lifting equipment will be eliminated. It will reduce the overall cost of building a wind turbine. It will also enable a construction of turbines in remote locations where the access for big cranes is either limited or impossible.

What is claimed is:

1. A combined hybrid water pressure energy accumulating and a wind turbine tower assembly comprising:
    a tower attached to a base;
    a yaw assembly mounted on top of the tower;
    a gearbox including a low-speed, high-torque shaft extended from one side of the gearbox; and a high-speed, low-torque shaft extended from another side of the gearbox;
    a wind turbine assembly including a plurality of turbine blades attached to a rotor hub; the rotor hub coaxially connected to the low-speed, high-torque shaft;
    a primary power generator connected to the high-speed, low-torque shaft;
    an electric motor coaxially connected to a water pump; wherein the electricity produced by the primary power generator driving the electric motor and the water pump and directly charging a battery pack storage assembly;
    a lower water reservoir positioned at the base;
    said water pump connected to said lower water reservoir via a conduit, lifting water from said lower water reservoir and delivering it into a smaller elevated water container between the middle and the top of the tower;
    a hydro-turbine rotated by a kinetic power of the water from the smaller elevated container, wherein said water is passing down through another conduit at the bottom of said elevated container;
    an auxiliary electric generator coaxially connected to a shaft of said hydro-turbine, converting the power of said shaft into electric current; said water, after striking a propeller of said hydro-turbine, being discharged back into said lower water reservoir; and a drain conduit pipe directing overflow water from said smaller elevated water container back into said lower water reservoir.

2. The combined hybrid water pressure energy accumulating and a wind turbine tower assembly according to claim 1, wherein said tower comprising commercial or residential building.

3. A combined hybrid water pressure energy accumulating and a wind turbine tower assembly comprising:
    a tower attached to a base;
    a yaw assembly mounted on top of the tower;
    a wind turbine assembly including a plurality of turbine blades attached to a rotor hub;
    a primary power generator, wherein a shaft of the rotor hub coupled directly to the primary power generator;
    an electric motor coaxially connected to a water pump; wherein the electricity produced by the primary power generator driving the electric motor and the water pump and directly charging a battery pack storage assembly;
    a lower water reservoir positioned at the base;
    said water pump connected to said lower water reservoir via a conduit, lifting water from said lower water reservoir and delivering it into a smaller elevated water container between the middle and the top of the tower;
    a hydro-turbine rotated by a kinetic power of the water from the smaller elevated container, wherein said water is passing down through another conduit at the bottom of said elevated container;
    an auxiliary electric generator coaxially connected to a shaft of said hydro-turbine converting the power of said shaft into electric current; said water, after striking a propeller of said hydro-turbine, being discharged back into said lower water reservoir; and a drain conduit pipe directing overflow water from said smaller elevated water container back into said lower water reservoir.

4. The combined hybrid water pressure energy accumulating and a wind turbine tower assembly according to claim 3, wherein said tower comprising commercial or residential building.

5. A combined hybrid water pressure energy accumulating and a wind turbine tower assembly comprising:
    a tower attached to a base;
    a gearbox including a low-speed, high-torque shaft extended from one side of the gearbox; and a high-speed, low-torque shaft extended from another side of the gearbox;
    a wind turbine assembly including a plurality of turbine blades and coaxially connected to the low-speed, high-torque shaft;
    a primary power generator connected to the high-speed, low-torque shaft,
    wherein said wind turbine assembly, the gear box and the primary power generator being vertically oriented;
    an electric motor coaxially connected to a water pump; wherein the electricity produced by the primary power generator driving the electric motor and the water pump and directly charging a battery pack storage assembly;
    a lower water reservoir positioned at the base;
    said water pump connected to said lower water reservoir via a conduit, lifting water from said lower water reservoir and delivering it into a smaller elevated water container between the middle and the top of the tower;
    a hydro-turbine rotated by a kinetic power of the water from the smaller elevated container, wherein said water is passing down through another conduit at the bottom of said elevated container;
    an auxiliary electric generator coaxially connected to a shaft of said hydro-turbine, converting the power of said shaft into electric current; said water, after striking a propeller of said hydro-turbine, being discharged back into said lower water reservoir; and a drain conduit pipe directing overflow water from said smaller elevated water container back into said lower water reservoir.

6. The combined hybrid water pressure energy accumulating and a wind turbine tower assembly according to claim 5, wherein said tower comprising commercial or residential building.

7. A combined hybrid water pressure energy accumulating and a wind turbine tower assembly comprising:
    a tower attached to a base;
    a wind turbine assembly including a plurality of turbine blades;
    a primary power generator, wherein a shaft of the wind turbine assembly coupled directly to the primary power generator;
    wherein said wind turbine assembly, the gear box and the primary power generator being vertically oriented;
    an electric motor coaxially connected to a water pump; wherein the electricity produced by the primary power generator driving the electric motor and the water pump and directly charging a battery pack storage assembly;

a lower water reservoir positioned at the base;
said water pump connected to said lower water reservoir via a conduit, lifting water from said lower water reservoir and delivering it into a smaller elevated water container between the middle and the top of the tower;
a hydro-turbine rotated by a kinetic power of the water from the smaller elevated container, wherein said water is passing down through another conduit at the bottom of said elevated container;
an auxiliary electric generator coaxially connected to a shaft of said hydro-turbine, converting the power of said shaft into electric current; said water, after striking a propeller of said hydro-turbine, being discharged back into said lower water reservoir; and a drain conduit pipe directing overflow water from said smaller elevated water container back into said lower water reservoir.

8. The combined hybrid water pressure energy accumulating and a wind turbine tower assembly according to claim 7, wherein said tower comprising commercial or residential building.

9. A combined hybrid water pressure energy accumulating and a wind turbine tower assembly comprising:
a tower attached to a base;
a yaw assembly mounted on top of the tower;
a wind turbine assembly including a plurality of turbine blades attached to a rotor hub;
a gearbox including a low-speed, high-torque horizontal shaft extended from one side of the gearbox; and a vertical shaft extended from another side of the gearbox;
wherein the rotor hub coupled directly to the low-speed, high-torque horizontal shaft;
a water pump; wherein the low-speed, high-torque horizontal shaft and the vertical shaft form a 90 degree angle and the vertical shaft passing through the yaw assembly and directly mechanically linked to a shaft of a water pump
a lower water reservoir positioned at the base;
said water pump connected to said lower water reservoir via a conduit, lifting water from said lower water reservoir and delivering it into a smaller elevated water container between the middle and the top of the tower;
a hydro-turbine rotated by a kinetic power of the water from the smaller elevated container, wherein said water is passing down through another conduit at the bottom of said elevated container;
an auxiliary electric generator coaxially connected to a shaft of said hydro-turbine, converting the power of said shaft into electric current; said water, after striking a propeller of said hydro-turbine, being discharged back into said lower water reservoir; and a drain conduit pipe directing overflow water from said smaller elevated water container back into said lower water reservoir.

10. The combined hybrid water pressure energy accumulating and a wind turbine tower assembly according to claim 9, wherein said tower comprising a commercial or residential building.

11. A combined hybrid water pressure energy accumulating and a wind turbine tower assembly comprising:
a tower attached to a base;
a vertical-axis wind turbine assembly including a plurality of turbine blades attached to a rotor hub having a vertical rotor shaft;
a water pump; wherein the vertical rotor shaft directly coupled to a shaft of the water pump a lower water reservoir positioned at the base;
said water pump connected to said lower water reservoir via a conduit, lifting water from said lower water reservoir and delivering it into a smaller elevated water container between the middle and the top of the tower;
a hydro-turbine rotated by a kinetic power of the water from the smaller elevated container, wherein said water is passing down through another conduit at the bottom of said elevated container;
an auxiliary electric generator coaxially connected to a shaft of said hydro-turbine, converting the power of said shaft into electric current; said water, after striking a propeller of said hydro-turbine, being discharged back into said lower water reservoir; and a drain conduit pipe directing overflow water from said smaller elevated water container back into said lower water reservoir.

12. The combined hybrid water pressure energy accumulating and a wind turbine tower assembly according to claim 11, wherein said tower comprising commercial or residential building.

13. A combined hybrid water pressure energy accumulating and a wind turbine tower assembly comprising:
a tower attached to a base;
a yaw assembly mounted on top of the tower;
a gearbox including a low-speed, high-torque shaft extended from one side of the gearbox; and a high-speed, low-torque shaft extended from another side of the gearbox;
a wind turbine assembly including a plurality of turbine blades attached to a rotor hub; the rotor hub coaxially connected to the low-speed, high-torque shaft;
a primary power generator connected to the high-speed, low-torque shaft;
an electric motor coaxially connected to a water pump; wherein the electricity produced by the primary power generator driving the electric motor and the water pump and directly charging a battery pack storage assembly;
a lower water reservoir positioned at the base;
said water pump connected to said lower water reservoir via a conduit, lifting water from said lower water reservoir and delivering it into a smaller elevated water container between the middle and the top of the tower;
a hydro-turbine rotated by a kinetic power of the water from the smaller elevated container, wherein said water is passing down through another conduit at the bottom of said elevated container;
an auxiliary electric generator coaxially connected to a shaft of said hydro-turbine, converting the power of said shaft into electric current; said water, after striking a propeller of said hydro-turbine, being discharged back into said lower water reservoir; and a drain conduit pipe directing overflow water from said smaller elevated water container back into said lower water reservoir; and
at least one water storage tower assembly located next to said tower; and at least one water storage tower having a large reservoir atop for conserving water delivered to it from said lower water reservoir via said conduit and said water pump; said water from said large reservoir atop being delivered under its own pressure via a conduit into said smaller elevated water container; a drain conduit pipe directing overflow water from said large reservoir back into said lower water reservoir.

* * * * *